United States Patent
Makimoto et al.

(10) Patent No.: US 12,522,744 B2
(45) Date of Patent: Jan. 13, 2026

(54) INK SET

(71) Applicant: DNP FINE CHEMICALS CO., LTD., Yokohama (JP)

(72) Inventors: Yuji Makimoto, Yokohama (JP); Syunya Morozumi, Yokohama (JP); Naoki Shiraishi, Yokohama (JP)

(73) Assignee: DNP FINE CHEMICALS CO., LTD., Yokohama (JP)

( * ) Notice: Subject to any disclaimer, the term of this patent is extended or adjusted under 35 U.S.C. 154(b) by 220 days.

(21) Appl. No.: 18/277,024

(22) PCT Filed: Mar. 2, 2022

(86) PCT No.: PCT/JP2022/008889
§ 371 (c)(1),
(2) Date: Aug. 11, 2023

(87) PCT Pub. No.: WO2022/186280
PCT Pub. Date: Sep. 9, 2022

(65) Prior Publication Data
US 2024/0117210 A1     Apr. 11, 2024

(30) Foreign Application Priority Data
Mar. 3, 2021 (JP) .................................. 2021-033825

(51) Int. Cl.
*C09D 11/54* (2014.01)
*B41J 2/01* (2006.01)
(Continued)

(52) U.S. Cl.
CPC .................. *C09D 11/54* (2013.01); *B41J 2/01* (2013.01); *B41J 2/135* (2013.01); *B41J 2/2107* (2013.01);
(Continued)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS 6,084,619 A * 7/2000 Takemoto .............. B41J 2/2114
                                                              347/100
6,443,568 B1 * 9/2002 Askeland ............. B41J 11/0015
                                                              347/100
(Continued)

FOREIGN PATENT DOCUMENTS

CN        102574406 A        7/2012
CN        103192620 A        7/2013
(Continued)

OTHER PUBLICATIONS

May 24, 2022 International Search Report issued in International Patent Application No. PCT/JP2022/008889.
(Continued)

*Primary Examiner* — Manish S Shah
(74) *Attorney, Agent, or Firm* — Oliff PLC

(57) ABSTRACT

An ink set with which it is possible to effectively prevent bleeding of aqueous ink even in the case when printing takes place at high speed by means of an inkjet discharge recording method. This ink set includes a pretreatment ink and an aqueous ink and is used for a recording method in which the respective inks are discharged on a base material as an inkjet. The respective inks included in said ink set have static surface tensions that satisfy the following relation: static surface tension SP of the pretreatment ink<static surface tension SC of the aqueous ink.

17 Claims, 2 Drawing Sheets

(51) Int. Cl.

| | |
|---|---|
| *B41J 2/135* | (2006.01) |
| *B41J 2/21* | (2006.01) |
| *B41J 11/00* | (2006.01) |
| *B41M 5/00* | (2006.01) |
| *B41M 7/00* | (2006.01) |
| *C09D 11/102* | (2014.01) |
| *C09D 11/107* | (2014.01) |
| *C09D 11/30* | (2014.01) |
| *C09D 11/322* | (2014.01) |
| *C09D 11/38* | (2014.01) |
| *C09D 11/40* | (2014.01) |

(52) U.S. Cl.
CPC ............ *B41J 11/0015* (2013.01); *B41M 5/00* (2013.01); *B41M 5/0047* (2013.01); *C09D 11/102* (2013.01); *C09D 11/107* (2013.01); *C09D 11/30* (2013.01); *C09D 11/322* (2013.01); *C09D 11/38* (2013.01); *C09D 11/40* (2013.01); *B41M 5/0011* (2013.01); *B41M 5/0017* (2013.01); *B41M 7/0036* (2013.01)

(58) Field of Classification Search
CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; B41M 5/0011; B41M 5/0017; B41M 5/0023; B41M 5/0047; B41M 7/00; B41M 7/0072; B41M 5/52; B41M 5/5218; B41M 5/5227
See application file for complete search history.

(56) References Cited

U.S. PATENT DOCUMENTS

| | | | | |
|---|---|---|---|---|
| 2005/0219341 A1* | 10/2005 | Nito | ........................ | B41J 2/2107 347/100 |
| 2005/0243121 A1* | 11/2005 | Onishi | .................... | B41J 2/2114 347/14 |
| 2008/0280044 A1* | 11/2008 | Okamura | ............... | C09D 11/40 106/31.89 |
| 2010/0236447 A1* | 9/2010 | Sakai | .................... | C09D 11/322 106/31.6 |
| 2011/0187789 A1* | 8/2011 | Saito | ..................... | C09D 11/107 347/100 |
| 2012/0128949 A1* | 5/2012 | Goto | ...................... | B41J 2/2107 428/207 |
| 2012/0268521 A1* | 10/2012 | Moribe | .................. | C09D 11/54 524/556 |
| 2013/0176369 A1 | 7/2013 | Gotou et al. | | |
| 2014/0055520 A1 | 2/2014 | Inumaru et al. | | |
| 2015/0054885 A1 | 2/2015 | Sugiyama | | |
| 2016/0052302 A1* | 2/2016 | Willems | ............... | B41M 5/0011 347/101 |
| 2016/0144634 A1* | 5/2016 | Emamjomeh | ........ | B41J 11/0015 347/19 |
| 2016/0222236 A1 | 8/2016 | Nakagawa et al. | | |
| 2018/0056691 A1 | 3/2018 | Arai et al. | | |
| 2018/0282567 A1* | 10/2018 | Ishida | .................. | C09D 11/322 |
| 2019/0283479 A1* | 9/2019 | Tamai | .................. | B41J 11/0015 |
| 2021/0147702 A1 | 5/2021 | Sohara | | |

FOREIGN PATENT DOCUMENTS

| | | | |
|---|---|---|---|
| JP | 2001-080199 A | | 3/2001 |
| JP | 2012-051357 A | | 3/2012 |
| JP | 2015-040347 A | | 3/2015 |
| JP | 2016-145336 A | | 8/2016 |
| JP | 2017-222143 A | | 12/2017 |
| JP | 2018-035270 A | | 3/2018 |
| JP | 2018-144495 A | | 9/2018 |
| JP | 2019-163442 A | | 9/2019 |
| JP | 2020-164571 A | | 10/2020 |
| JP | 2021-098310 A | | 7/2021 |
| WO | 2020/017603 A1 | | 1/2020 |

OTHER PUBLICATIONS

Jun. 21, 2022 Office Action issued in Japanese Patent Application No. 2022-086002.
Jul. 26, 2022 Office Action issued in Japanese Patent Application No. 2022-086002.
Mar. 29, 2022 Office Action issued in Japanese Patent Application No. 2022-031912.
May 12, 2025 Extended European Search Report issued in European Patent Application No. 22763334.4.
Aug. 2, 2025 Office Action issued in Chinese Patent Application No. 202280015165.9.
Aug. 7, 2025 Office Action issued in Taiwanese Patent Application No. 111107764.
Zeng Xiaoying et al., "Electron Beam Curing Coatings and Applications," Tianjin University Press, 1st Edition, 1st Printing, Dec. 2014, Dec. 31, 2014, p. 99.
Oct. 11, 2025 Office Action issued in Chinese Patent Application No. 202280015165.9.

* cited by examiner

INK SET

TECHNICAL FIELD

The present invention relates to an ink set mainly including a pretreatment ink and a water-based ink. The present invention also relates to an inkjet recording method using the ink set, to a method of producing a print, and to a device for ejecting the ink set.

BACKGROUND ART

Inkjet recording method is a recoding method including ejecting droplets of an ink composition from a very fine nozzle directly onto a substrate, such as a paper sheet, to form printed letters and images.

This recording method has spread beyond home-use to office and industrial printing applications since it enables non-contact printing on substrates and easily achieves printing with compact equipment, high-speed printing, low-noise printing, power-saving printing, and color printing.

Ink compositions widely used for the inkjet recording method include water-based inks, which include solutions of various colorants in water or a mixture of water and a water-soluble organic solvent. Such water-based inks, in which water is a main component, have less impact on the environment and are non-flammable and highly safe for workers.

Unfortunately, when sprayed on widely and commonly used substrates, such as paper (e.g., plain paper, recycled paper), water-based inks can spread from the landing position to the surrounding and bleed while being absorbed into paper fibers.

Thus, there is a process that focuses on anionic properties of colorants and includes ejecting, onto a substrate, a pretreatment ink containing a cationic compound before the ejection of a water-based ink onto the substrate; and then ejecting the water-based ink onto the pretreatment ink on the substrate (see, for example, Patent Document 1).

Inkjet methods include scanning methods and single-pass methods. In the scanning method, a certain amount of ink is ejected in several parts while the inkjet head is moved in the right and left directions. The single-pass method uses a fixed inkjet head and includes passing a substrate once under the fixed inkjet head to form an image.

The single-pass method, which can form an image by passing the substrate only once under the inkjet head, is advantageous in that it can produce prints (multilayer products) with high productivity at high speed.

For example, Patent Document 2 discloses a single-pass inkjet recording method characterized by including: ejecting an ink with a low L* value; and finally ejecting an ink with a high L* value and discloses an ink set for use in such a single-pass inkjet recording method.

According to Patent Document 2, the disclosed inkjet recording method can be performed with less bleeding (blurring) between color inks and no strike-through on the recording medium (substrate).

Patent Document 1: Japanese Unexamined Patent Application, Publication No. 2012-051357
Patent Document 2: Japanese Unexamined Patent Application, Publication No. 2018-144495

DISCLOSURE OF THE INVENTION

Problems to be Solved by the Invention

Meanwhile, in recent years, the inkjet recording method has been required to feed the substrate at higher rate during the printing with inks being ejected from ink ejection units. Thus, the time taken for each ink to land on the substrate has been shortened, which may cause some water-based inks to spread from the landing position to the surrounding and to bleed. Such a problem is particularly noticeable for high-speed printing.

A method for preventing such bleeding includes, for example, using a drying mechanism provided between ink ejection units to dry the ink landed on the substrate. Unfortunately, the installation of such a drying mechanism requires a relatively large system for ejecting a set of inks and makes it difficult to reduce the size or cost of the system.

It is an object of the present invention, which has been made in view of the circumstances described above, to provide an ink set with which, even during inkjet recording, a water-based ink can be printed while being effectively prevented from bleeding.

Means for Solving the Problems

As a result of intensive studies for solving the problem described above, the inventors have created an ink set including a pretreatment ink and a water-based ink having static surface tensions controlled to fall within a specific range and have completed the present invention based on findings that such an ink set provides a solution to the problem described above.

Specifically, the present invention provides the following aspects.

(1) An ink set for use in an inkjet recording method,
the ink set including a pretreatment ink and a water-based ink each to be jetted onto a substrate,
the pretreatment ink and the water-based having static surface tensions satisfying the following relation:

the static surface tension $Sp$ of the pretreatment ink<the static surface tension $Sc$ of the water-based ink.

(2) The ink set according to aspect (1), further including an overcoat ink,
wherein the overcoat ink, the pretreatment ink, and the water-based ink have static surface tensions satisfying the following relation:

the static surface tension $So$ of the overcoat ink≤the static surface tension $Sp$ of the pretreatment ink<the static surface tension $Sc$ of the water-based ink.

(3) The ink set according to aspect (2), wherein the static surface tension $Sc$ of the water-based ink and the static surface tension $So$ of the overcoat ink have a difference of 0.6 mN/m or more.

(4) The ink set according to any one of aspects (1) to (3), wherein the ink set is for use in a single-pass inkjet recording method including jetting each of inks onto a substrate using a single-pass system.

(5) An inkjet recording method using the ink set according to any one of aspects (1) to (4), the inkjet recording method including jetting each of the inks of the ink set onto a substrate using a single-pass system.

(6) The inkjet recording method according to aspect (5), wherein each of the inks of the ink set is jetted onto the substrate from each of ejection units with no drying mechanism between the ejection units.

(7) A method of producing a print using the ink set according to any one of aspects (1) to (4), the method including jetting each of the inks of the ink set onto a substrate using a single-pass system.

(8) The method according to aspect (7), wherein each of the inks of the ink set is jetted onto the substrate from each of ejection units with no drying mechanism between the ejection units.

(9) A device for ejecting an ink set including a pretreatment ink and a water-based ink,
the device including: a pretreatment ink ejection unit that ejects the pretreatment ink; and a water-based ink ejection unit that ejects the water-based ink onto a substrate,
the pretreatment ink ejection unit and the water-based ink ejection unit being arranged in this order along a direction in which the substrate is to be fed,
the pretreatment ink and the water-based ink having static surface tensions satisfying the following relation:

the static surface tension Sp of the pretreatment ink<the static surface tension Sc of the water-based ink.

(10) The device according to aspect (9), wherein no drying mechanism is provided between the pretreatment ink ejection unit and the water-based ink ejection unit.

(11) A device for ejecting an ink set including a pretreatment ink, a water-based ink, and an overcoat ink,
the device including: a pretreatment ink ejection unit that ejects the pretreatment ink onto a substrate; a water-based ink ejection unit that ejects the water-based ink; and an overcoat ink ejection unit that ejects the overcoat ink,
the pretreatment ink ejection unit, the water-based ink ejection unit, and the overcoat ink ejection unit being arranged in this order along a direction in which the substrate is to be fed,
the pretreatment ink, the water-based ink, and the overcoat ink having static surface tensions satisfying the following relation:

the static surface tension So of the overcoat ink≤the static surface tension Sp of the pretreatment ink<the static surface tension Sc of the water-based ink.

(12) The device according to aspect (11), wherein no drying mechanism is provided between the water-based ink ejection unit and the overcoat ink ejection unit.

(13) The device according to aspect (11), wherein no drying mechanism is provided between the pretreatment ink ejection unit and the water-based ink ejection unit.

(14) The device according to aspect (11), wherein no drying mechanism is provided between the water-based ink ejection unit and the overcoat ink ejection unit and no drying mechanism is provided between the pretreatment ink ejection unit and the water-based ink ejection unit.

(15) An ink set for use in an inkjet recording method, the ink set including a water-based ink and an overcoat ink each to be jetted onto a substrate,
the water-based ink and the overcoat ink having static surface tensions satisfying the following relation:

the static surface tension So of the overcoat ink<the static surface tension Sc of the water-based ink.

(16) A device for ejecting, onto a substrate, an ink set including a water-based ink and an overcoat ink,
the device including: a water-based ink ejection unit that ejects the water-based ink; and an overcoat ink ejection unit that ejects the overcoat ink;
the water-based ink ejection unit and the overcoat ink ejection unit being arranged in this order along a direction in which the substrate is to be fed,
the overcoat ink and the water-based ink having static surface tensions satisfying the following relation:

the static surface tension So of the overcoat ink<the static surface tension Sc of the water-based ink.

(17) The device according to aspect (16), wherein no drying mechanism is provided between the water-based ink ejection unit and the overcoat ink ejection unit.

Effects of the Invention

Using the ink set of the present invention, the water-based ink can be printed while being effectively prevented from bleeding even during inkjet recording.

PREFERRED MODE FOR CARRYING OUT THE INVENTION

Figure 1:
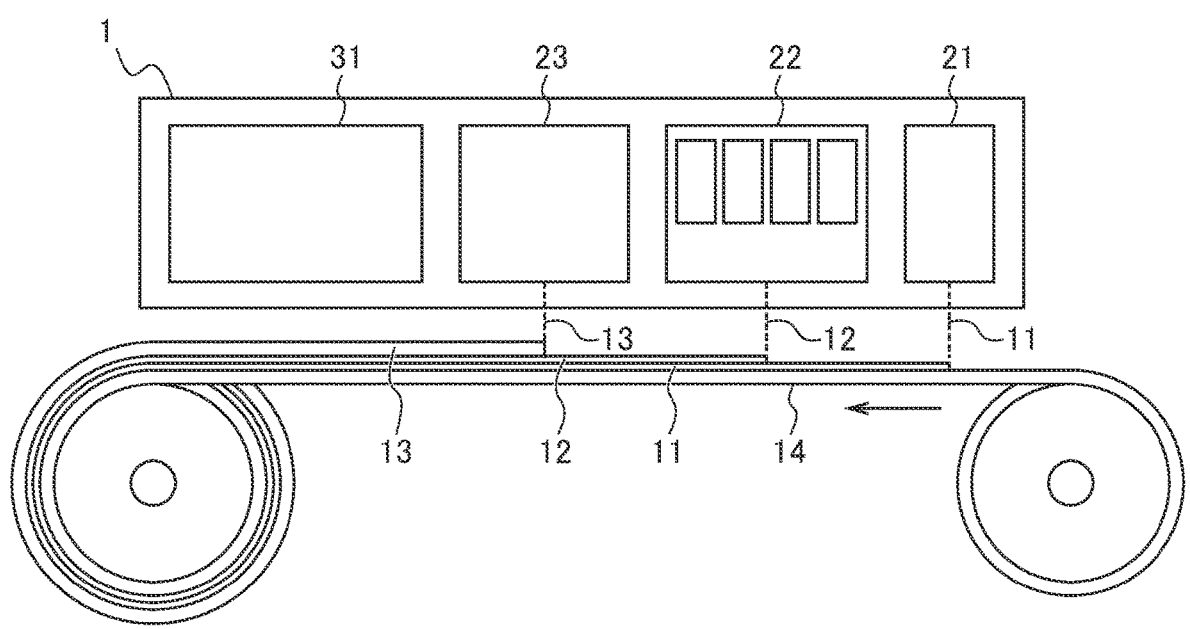
FIG. 1 is a schematic diagram showing an ink set ejection device suitable for use in ejecting an ink set according to an embodiment of the present invention.

Hereinafter, specific embodiments of the present invention will be described in detail. The embodiments described below are not intended at all to limit the present invention and may be appropriately altered or modified within the scope of the object of the present invention.
1-1. Outline of Ink Set According to First Embodiment of the Present Invention
A first embodiment of the present invention is directed to an ink set for use in an inkjet recording method, the ink set including a pretreatment ink and a water-based ink each to be jetted onto a substrate, the pretreatment ink and the water-based ink having static surface tensions satisfying the relation shown below.

The static surface tension Sp of the pretreatment ink<the static surface tension Sc of the water-based ink Using such an ink set, the water-based ink can be printed while being effectively prevented from bleeding even during high-speed inkjet recording. During high-speed printing by inkjet recording method, the time is relatively short between the landing of the pretreatment ink on the substrate and the landing of the water-based ink on the pretreatment ink on the substrate. This suggests that there is a risk of spreading and bleeding of the water-based ink, which would be caused by the landing of the water-based ink onto the pretreatment ink remaining highly fluid on the substrate.

To address this problem, the ink set is designed such that the static surface tension Sp of the pretreatment ink is lower than the static surface tension Sc of the water-based ink. This design can prevent the spreading of the water-based ink even when the water-based ink is landed on the pretreatment ink remaining highly fluid on the substrate. This can effectively prevent the bleeding of the water-based ink. In the ink set according to the first embodiment, the pretreatment ink contains a cationic compound to prevent the bleeding of the water-based ink more effectively.
1-2. Ink Set
Hereinafter, a specific mode of the ink set according to the first embodiment will be described with reference to an ink set example that includes a pretreatment ink, a water-based ink, and an overcoat ink and is for use in a single-pass inkjet recording method including ejecting each of inks onto a substrate using a single-pass system. The ink set according to the first embodiment does not have to include an overcoat ink as an essential component. However, when ejected onto the water-based ink on the substrate, the overcoat ink, which has a desired function, can form an overcoat layer having a desired function, such as the function of imparting scratch resistance, gloss, or weather fastness to the resulting print or the function of imparting a matte (lusterless) or metallic appearance to the print surface.

In the single-pass inkjet recording method, which enables relatively high speed printing, the time taken for each ink to land on the substrate is relatively short and thus there is a relatively high risk of causing the water-based ink to spread from the landing position to the surrounding and to bleed. The ink set according to the first embodiment does not always have to be used for the single-pass inkjet recording method and may be used, for example, for a scanning inkjet recording method that includes performing printing over a substrate (recording medium) using an inkjet head that reciprocates in synchronization with the substrate and moves in a direction perpendicular to the substrate feed direction. However, when used for the single-pass inkjet recording method, such as line head printing, the ink set according to the first embodiment will be advantageous in that high-speed printing is possible with it without any problem with the single-pass inkjet recording method.

Specifically, the ink set according to this embodiment includes a pretreatment ink, a water-based ink, and an overcoat ink, in which the pretreatment ink, the water-based ink, and the overcoat ink have static surface tensions satisfying the relation shown below.

The static surface tension So of the overcoat ink≤the static surface tension Sp of the pretreatment ink<the static surface tension Sc of the water-based ink.

Figure 2:
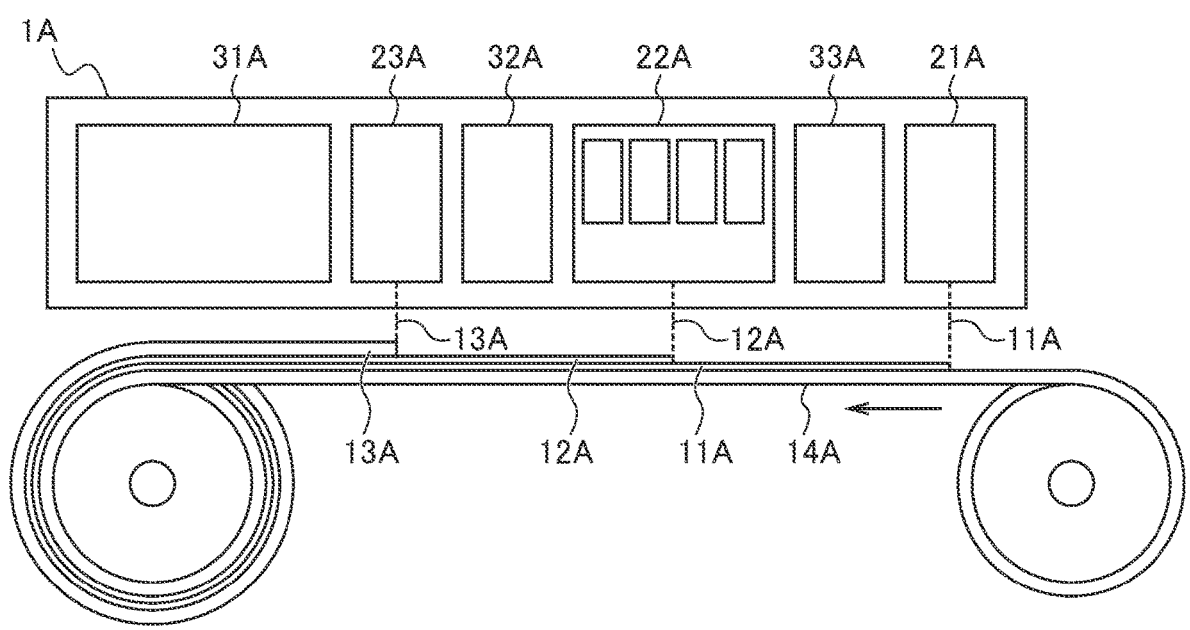
FIG. 2 is a schematic diagram showing a conventional ink set ejection device.

FIG. 2 shows a conventional device 1A for jetting inks using a single-pass system. The device 1A includes a pretreatment ink ejection unit 21A that ejects a pretreatment ink 11A; a water-based ink ejection unit 22A that ejects a water-based ink 12A; and an overcoat ink ejection unit 23A that ejects an overcoat ink 13A, in which the ejection units 21A, 22A, and 23A are arranged in this order along the direction in which the substrate (recording medium) is to be fed.

The device 1A also includes a drying mechanism 32A between the ejection units 22A and 23A and a drying mechanism 33A between the ejection units 21A and 22A. In the device 1A, one ink is landed on the substrate and dried with the drying mechanism so that another ink is ready to be landed. Even during single-pass, high-speed printing, this reduces the fluidity of each ink landed on the substrate and thus effectively prevents the bleeding of the water-based ink.

Unfortunately, the installation of the drying mechanism between the ejection units will increase the size of the device and make it difficult to reduce the size or cost of the device. Moreover, even if the single-pass system is used to increase the substrate (recording medium) feed rate, the substrate (recording medium) must travel along a long feed unit from when inserted into the printer to when dried, which will lead to a reduction in printing (recording) speed and a reduction in print production speed.

To address this problem, the static surface tensions So, Sp, and Sc of the inks are controlled to satisfy the relation So≤Sp<Sc. This can effectively prevent the bleeding of the water-based ink even when the device 1 shown in FIG. 1, which has no drying mechanism between each set of the adjacent ejection units, is used to jet the inks onto the substrate (recording medium) being fed.

It is not necessarily clear why the bleeding of the water-based ink can be prevented when the static surface tension Sp of the pretreatment ink is lower than the static surface tension Sc of the water-based ink (Sp<Sc). One speculation is that after the water-based ink is landed on the surface of the pretreatment ink, the water-based ink can flow in such a direction as to contract itself (inward direction), which will control the wetting by and spreading of the water-based ink on the surface of the pretreatment ink to effectively prevent the bleeding of the water-based ink.

The pretreatment ink may be one capable of forming an ink absorbing layer or the like when it is ejected on the substrate and solidified or dried. Preferably, however, the pretreatment ink is one capable of remaining liquid (in a fluid state) during the period from when it is landed on the substrate until the water-based ink is landed on the substrate.

The spreading of the water-based ink can be prevented even when the water-based ink is landed on the pretreatment ink remaining highly fluid on the substrate. Moreover, landing the water-based ink onto the pretreatment ink remaining highly fluid on the substrate will make it possible to perform higher speed printing and thus to increase the print production speed.

Upon the landing of the overcoat ink onto the substrate, the pretreatment ink and the water-based ink landed on the substrate have already been in a mixed state. If the static surface tension So of the overcoat ink is lower than or equal to the static surface tension Sp of the pretreatment ink (So≤Sp), it will necessarily be lower than the static surface tension of the mixture of the pretreatment ink and the water-based ink already landed on the substrate. It is not necessarily clear why the bleeding of the water-based ink can be prevented when the static surface tension So of the overcoat ink is lower than or equal to the static surface tension Sp of the pretreatment ink (So≤Sp). One speculation is that the overcoat ink can flow in such a direction as to spread itself (outward direction) at the interface between it and the mixture (the mixture of the pretreatment ink and the water-based ink) while the mixture (the mixture of the pretreatment ink and the water-based ink) can flow in such a direction as to contract itself (inward direction), which will control the wetting by and spreading of the water-based ink to effectively prevent the bleeding of the water-based ink.

The overcoat ink may be landed on a layer formed by solidifying or drying the water-based ink. Preferably, however, the overcoat ink is ejected and landed on the substrate during the period when the water-based ink (or the mixture of the water-based ink and the pretreatment ink) remains liquid (in a fluid state) after being landed on the substrate. The spreading of the water-based ink can be prevented even when the overcoat ink is landed on the water-based ink (or the mixture of the water-based ink and the pretreatment ink) remaining highly fluid on the substrate. Moreover, landing the overcoat ink onto the water-based ink (or the mixture of the water-based ink and the pretreatment ink) remaining highly fluid on the substrate will make it possible to perform higher speed printing and thus to increase the print production speed.

Regarding the static surface tensions of the inks satisfying the relation So≤Sp<Sc, the difference (Sc−Sp) between Sc and Sp preferably has a lower limit of 0.5 mN/m or more, more preferably 0.7 mN/m or more, even more preferably 0.9 mN/m or more. With a difference (Sc−Sp) between Sc and Sp of 0.5 mN/m or more, the water-based ink can be more effectively prevented from bleeding. While the reason for this is not necessarily clear, a possible speculation is that after the water-based ink is landed on the surface of the pretreatment ink, the water-based ink can flow in such a direction as to contract itself (inward direction) and thus can be more effectively prevented from bleeding.

The upper limit of the difference (Sc−Sp) between Sc and Sp is preferably, but not limited to, 7.0 mN/m or less, more preferably 5.5 mN/m or less, even more preferably 3.0 mN/m or less. With a difference (Sc−Sp) between Sc and Sp of 7.0 mN/m or less, the water-based ink can be effectively prevented from causing cissing. While the reason for this is not necessarily clear, a possible speculation is that with a difference (Sc−Sp) between Sc and Sp of 7.0 mN/m or less, the water-based ink can exhibit adequate wetting and spreading behavior to successfully infiltrate into the substrate.

The lower limit of the difference (Sp−So) between Sp and So is preferably 0 mN/m or more, more preferably 0.2 mN/m or more, even more preferably 0.4 mN/m or more. With a difference (Sp−So) between Sp and So of 0 mN/m or more, the water-based ink can be prevented from bleeding. While the reason for this is not necessarily clear, a possible speculation is that when the difference (Sp−So) between Sp and So is 0 mN/m or more, the mixture (the mixture of the pretreatment ink and the water-based ink) can flow in such a direction as to contract itself (inward direction) against the overcoat ink so that the water-based ink can be prevented from bleeding.

The upper limit of the difference (Sp−So) between Sp and So is preferably, but not limited to, 3.5 mN/m or less, more preferably 3.0 mN/m or less, even more preferably 2.7 mN/m or less. With a difference (Sp−So) between Sp and So of 3.5 mN/m or less, the water-based ink can be more effectively prevented from bleeding. The reason for this is not necessarily clear. If the difference (Sp−So) between Sp and So is too large, the overcoat ink may exhibit excessive wetting and spreading behavior, which the mixture (the mixture of the pretreatment ink and the water-based ink) may physically follow to exhibit wetting and spreading behavior, so that the bleeding of the water-based ink will tend to be relatively significant. A possible speculation is that with a difference (Sp−So) between Sp and So of 3.5 mN/m or less, the overcoat ink can be prevented from exhibiting significant wetting and spreading behavior, which will lead to more effective prevention of the bleeding of the water-based ink.

The lower limit of the difference (Sc−So) between Sc and So is preferably 0.6 mN/m or more, more preferably 0.8 mN/m or more, even more preferably 0.9 mN/m or more. With a difference (Sc−So) between Sc and So of 0.6 mN/m or more, the water-based ink can be more effectively prevented from bleeding. While the reason for this is not necessarily clear, a possible speculation is that when the difference (Sc−So) between Sc and So is 0.6 mN/m or more, the mixture (the mixture of the pretreatment ink and the water-based ink) can flow in such a direction as to contract itself (inward direction) against the overcoat ink so that the water-based ink can be prevented from bleeding.

The upper limit of the difference (Sc−So) between Sc and So is preferably, but not limited to, 7.5 mN/m or less, more preferably 6.0 mN/m or less, even more preferably 4.5 mN/m or less. With a difference (Sc−So) between Sc and So of 7.5 mN/m or less, the water-based ink can be more effectively prevented from bleeding. The reason for this is not necessarily clear. If the difference (Sc−So) between Sc and So is too large, the overcoat ink may exhibit excessive wetting and spreading behavior, which the mixture (the mixture of the pretreatment ink and the water-based ink) may physically follow to exhibit wetting and spreading behavior, so that the bleeding of the water-based ink will tend to be relatively significant. A possible speculation is that with a difference (Sc−So) between Sc and So of 7.5 mN/m or less, the overcoat ink can be prevented from exhibiting significant wetting and spreading behavior, which will lead to more effective prevention of the bleeding of the water-based ink.

Next, each of the inks of the ink set according to the first embodiment will be described.

Pretreatment Ink

The pretreatment ink is a water-based ink including water as a main component and a cationic compound. The pretreatment ink is used prior to the ejection of the water-based ink onto the substrate. The pretreatment ink may be any type containing a cationic compound as long as the static surface tensions of the respective inks fall within the specified range.

Cationic Compound

The cationic compound can cause aggregation of colorant molecules in the water-based ink described later and prevent colorant molecules from spreading from the landing position to the surrounding and thus from causing bleeding. The cationic compound may be a cationic resin having a cationic group or may be a metal salt composed of a metal ion (cationic compound) and an anion. Among them, the cationic resin having a cationic group is preferably used. The cationic resin is more effective in preventing the bleeding of the water-based ink. The reason for this is not necessarily clear. The cationic resin has many reactive sites in its molecular chain, which can become entangled, and thus can have a higher ability to form aggregates with the colorant in the water-based ink. The cationic resin can also increase the ability of the pretreatment ink to infiltrate. These features are considered to contribute to more effective prevention of the bleeding of the water-based ink.

The cationic resin may be a resin having an amino group, an ammonium group, an amide group, a —NHCONH$_2$ group, or any other cationic group. The cationic resin may be synthesized by known methods or obtained commercially.

The cationic resin may be synthesized by known methods or obtained commercially. Examples of the commercially available cationic resin include APC-810, APC-815, D-6010, D-6020, D-6030, D-6040, D-6050, D-6060, D-6080, D-6310, DEC-50, DEC-53, DEC-56, DEC-65, FL-14, FL-42, FL-44LF, FL-61, FL-2099, FL-2250, FL-2273, FL-2350, FL-2550, FL-2565, FL-2599, FL-2650, FL-2850, FL-2949, FL-3050, FL-3150, FL-4340, FL-4420, FL-4440, FL-4450, FL-4520, FL-4530, FL-4535, FL-4540, FL-4620, FL-4820, FQP-1264, RSL-18-22, RSL-4071H, RSL-4400, RSL-8391, RSL-8391H, RSL-HD70C, RSL-HF70D, and WS-72 (manufactured by SNF); Arafix 100, 251S, 255, and 255LOX (manufactured by Arakawa Chemical Industries, Ltd.); DK-6810, DK-6853, DK-6885, WS-4010, WS-4011, WS-4020, WS-4024, WS-4027, and WS-4030 (manufactured by Seiko PMC Corporation); Senka F-300, Papyogen P-105, P-113, P-271, and P-316, Pitchnol QGSA, Milliogen P-20, Unisense FPA 100L, FPA 101L, FPA 102L, FPA 1000L, FPA 1001L, FPA 100LU, FPA 102LU, and FPA 1000LU, Unisense FCA 1000L, FCA 1001L, FCA 1002L, FCA 1003L, and FCA 5000L, Unisense KCA 100L, KCA 100LU, KCA 1000LU, and KCA 1001LU, Unisense KHE 100L, KHE 101L, KHE 102L, E104L, KHE 105L, KHE 107L, KHE 1000L, and KHE 1001L, Unisense KHP 10P, KHP 11L, KHP 10LU, KHP 11LU, KHP 12LU, and KHP 20LU, Unisense KHF 10L and KHF 11L, Unisense FPV 1000L and FPV 1000LU, Unisense FCV 1000L, Unisense ZCA 1000L, ZCA 1001L, ZCA 1002L, and ZCA 5000L, and Unisense KPV 100LU and KPV 1000LU (manufactured by Senka Corporation); Pararock 410K101, 410K111, 420K308, 420K300, 460K313, 460K318, 470K308, 480K300, 490K300, 490K309, 500K30E, 500K40E, 59D, 920AP500, 975AP500, PD700, PD714L, PD714S, and P600, (manufactured by Asada Chemical Industry Co., Ltd.); Sumirez Resin 650(30), 675A, 6615, and SLX-1 (manufactured by Taoka Chemical Co., Ltd.); EP-1137, MZ-477, MZ-480, NS-310X, and NS-625XC (manufactured by Takamatsu Oil & Fat Co., Ltd.); PAA-D11-HCL, D19-HCL, D41-HCL, D19A, PAA-HCL-03, PAA-HCL-05, PAA-HCL-3L, PAA-HCL-10L, PAA-1112CL, PAA-21CL, PAA-AC5050A, PAA-N5050CL, PAA-SA, PAS-A-1, PAS-A-5, PAS-H-1L, PAS-H-5L, PAS-H-10L, PAS-J-81, PAS-J-81L, PAS-M-1, PAS-M-1A, PAS-M-1L, PAS-21 PAS-21CL, PAS-22SA-40, PAS-24, PAS-92, PAS-92A, PAS-880, PAS-2201CL, and PAS-2401 (manufactured by Nittobo Medical Co., Ltd.); PP-17 (manufactured by Meisei Chemical Works, Ltd.); Catiomaster PD-1, PD-7, PD-30, PD-A, PDT-2, PE-10, PE-30, DT-EH, EPA-SK01, and TMHMDA-E (manufactured by Yokkaichi Chemical Co., Ltd.); and Jetfix 36N, 38A, and 5052 (manufactured by Satoda Chemical Industrial Co., Ltd.).

The cationic resin may be dissolved in the pretreatment ink or dispersed as fine resin particles in the pretreatment ink.

The metal salt may be a multivalent metal salt including a multivalent metal ion with a valence of at least two and an anion. Examples of the multivalent metal ion include calcium ion, magnesium ion, aluminum ion, titanium ion, iron(II) ion, iron(III) ion, cobalt ion, nickel ion, copper ion, zinc ion, barium ion, and strontium ion.

In particular, the metal salt preferably contains at least one selected from the group consisting of calcium ion, magnesium ion, nickel ion, zinc ion, and aluminum ion so that it can significantly interact with the colorant in the ink composition to effectively prevent bleeding and unevenness.

The anion may be an inorganic anion or an organic anion. Examples of the organic anion include anions derived from acetic acid, benzoic acid, salicylic acid, 2,4-dihydroxybenzoic acid, 2,5-dihydroxybenzoic acid, dimethylolpropionic acid, pantothenic acid, succinic acid, maleic acid, glutaric acid, suberic acid, trimellitic acid, and methylmalonic acid. Examples of the inorganic anion include chloride ion, bromide ion, nitrate ion, and sulfate ion.

The content of the cationic compound in the pretreatment ink may be any suitable level. The content of the cationic compound in the pretreatment ink preferably has a lower limit of 0.5 mass % or more, more preferably 0.8 mass % or more, even more preferably 1.0 mass % or more, based on the total mass of the pretreatment ink.

The pretreatment ink containing 0.5 mass % or more of the cationic compound based on its total mass can more effectively fix the colorant and more effectively prevent the bleeding of the water-based ink. The content of the cationic compound in the pretreatment ink preferably has an upper limit of 9 mass % or less, more preferably 8 mass % or less, even more preferably 7 mass % or less, based on the total mass of the pretreatment ink. The pretreatment ink containing 9 mass % or less of the cationic compound based on its total mass can have higher storage stability and more stable jettability.

Resin

In the pretreatment ink, the resin may be at least partially in the form of a resin emulsion. The term "resin emulsion" means an aqueous dispersion containing resin fine particles dispersed in a water-soluble solvent that forms a continuous phase. In the form of a resin emulsion, the resin can disperse as fine particles in the acceptor solution thanks to steric and electrostatic repulsive forces.

In the pretreatment ink, the resin is typically, but not limited to, a resin including at least one resin or copolymer resin selected from the group consisting of acrylic resin, styrene-acrylic resin, polyurethane resin, polyester resin, vinyl chloride resin, vinyl acetate resin, polyether resin, vinyl chloride-vinyl acetate copolymer resin, polyethylene resin, acrylamide resin, epoxy resin, polycarbonate resin, silicone resin, and polystyrene resin, or any mixture thereof.

The content of the resin in the pretreatment ink may be any suitable level. The content of the resin in the pretreatment ink preferably has a lower limit of 0.5 mass % or more, more preferably 0.8 mass % or more, even more preferably 1.0 mass % or more, based on the total mass of the pretreatment ink.

The content of the resin in the pretreatment ink preferably has an upper limit of 20.0 mass % or less, more preferably 15.0 mass % or less, even more preferably 10.0 mass % or less, based on the total mass of the pretreatment ink.

Water

The pretreatment ink contains water as a main component. The water is preferably deionized water or any other type of water free of various types of ions. The content of water in the pretreatment ink may be any suitable level that allows dispersion or dissolution of each component. The content of water in the pretreatment ink preferably has a lower limit of 30 mass % or more, more preferably 50 mass % or more, even more preferably 55 mass % or more, furthermore preferably 60 mass % or more, based on the total mass of the pretreatment ink. The content of water in the pretreatment ink preferably has an upper limit of 85 mass % or less, more preferably 82 mass % or less, even more preferably 80 mass % or less, based on the total mass of the pretreatment ink.

Water-Soluble Solvent

The pretreatment ink may contain a water-soluble solvent. The water-soluble solvent should be one capable of dispersing or dissolving the resin and any other component.

As used herein, the term "water-soluble solvent" refers to a solvent capable of being dissolved in an amount of 5 parts by mass or more, preferably 20 parts by mass or more, more preferably 50 parts by mass or more, even more preferably 70 parts by mass or more, in 100 parts by mass of water at 25° C. and 1 atm.

Examples of the water-soluble solvent include $C_1$ to $C_5$ alkyl alcohols, such as methyl alcohol, ethyl alcohol, n-propyl alcohol, isopropyl alcohol, n-butyl alcohol, sec-butyl alcohol, tert-butyl alcohol, isobutyl alcohol, and n-pentanol; monohydric alcohols, such as 3-methoxy-3-methyl-1-butanol, 3-methoxy-1-propanol, 1-methoxy-2-propanol, and 3-methoxy-n-butanol; amides, such as formamide, acetamide, propanamide, butanamide, isobutylamide, pentanamide, N-methylformamide, N-methylacetamide, N-methylpropanamide, N-methylbutanamide, N-methylisobutylamide, N-methylpentanamide, N-ethylformamide, N-ethylacetamide, N-ethylpropanamide, N-ethylbutanamide, N-ethylisobutylamide, N-ethylpentanamide, N-propylformamide, N-propylisobutylamide, N-propylpentanamide, N-isopropylformamide, N-isopropylacetamide, N-isopropylpropanamide, N-isopropylbutanamide, N-isopropylisobutylamide, N-isopropylpentanamide, N-butylformamide, N-butylacetamide, N-butylpropanamide, N-butylbutanamide, N-butylisobutylamide, N-butylpentanamide, N,N-dimethylformamide, N,N-dimethylacetamide, N,N-dimethylpropanamide, N,N-dimethylbutanamide, N,N-dimethylisobutylamide, N,N-dimethylpentanamide, N,N-diethylformamide, N,N-diethylacetamide, N,N diethylpropanamide, N,N-diethylbutanamide, N,N-diethylisobutylamide, N,N-diethylpentanamide, N,N-dipropylformamide, N,N-dipropylacetamide, N,N-dipropylpropanamide, N,N-dipropylbutanamide, N,N-dipropylisobutylamide, N,N-dipropylpentanamide, N,N-diisopropylformamide, N,N-diisopropylacetamide, N,N-diisopropylpropanamide, N,N-diisopropylbutanamide, N,N-diisopropylisobutylamide, N,N-diisopropylpentanamide, N,N-dibutylformamide, N,N-dibutylacetamide, N,N-dibutylpropanamide, N,N-dibutylbutanamide, N,N-dibutylisobutylamide, N,N-dibutylpentanamide, N-ethyl-N-methylformamide, N-ethyl-N-methylacetamide, N-ethyl-N-methylpropanamide, N-ethyl-N-methylbutanamide, N-ethyl-N-methylisobutylamide, N-ethyl-N-methylpentanamide, N-methyl-N-propylformamide, N-methyl-N-propylacetamide, N-methyl-N-propylpropanamide, N-methyl-N-propylbutanamide, N-methyl-N-propylformamide, N-ethyl-N-propylacetamide, N-ethyl-N-propylpropanamide, N-ethyl-N-propylbutanamide, N-ethyl-N-propylisobutylamide, and N-ethyl-N-propylpentanamide; ketones or keto alcohols, such as acetone and diacetone alcohol; ethers, such as tetrahydrofuran and dioxane; oxyethylene or oxypropylene copolymers, such as polyethylene glycol and polypropylene glycol; diols, such as ethylene glycol, propylene glycol, diethylene glycol, dipropylene glycol, 1,3-propanediol, isobutylene glycol, triethylene glycol, tripropylene glycol, tetraethylene glycol, 1,3-propanediol, 2-methyl-1,2-propanediol, 2-methyl-1,2-propanediol, 1,2-butanediol, 1,3-butanediol, 1,4-butanediol, 1,2-pentanediol, 1,2-hexanediol, 1,5-pentanediol, 1,6-hexanediol, 2-methyl-2,4-pentanediol, 3-methyl-1,3-butanediol, 3-methyl-1,5-pentanediol, and 2-methyl-2,4-pentanediol; triols, such as glycerol, trimethylolethane, trimethylolpropane, and 1,2,6-hexanetriol; tetrahydric alcohols, such as meso-erythritol and pentaerythritol; monoalkyl ethers, such as ethylene glycol monomethyl (or ethyl, isopropyl, n-butyl, isobutyl, n-hexyl, or 2-ethylhexyl) ether, diethylene glycol monomethyl (or ethyl, isopropyl, n-butyl, isobutyl, n-hexyl, or 2-ethylhexyl) ether, triethylene glycol monomethyl (or ethyl, propyl, isopropyl, n-butyl, isobutyl, tert-butyl, pentyl, n-hexyl, or 2-ethylhexyl) ether, propylene glycol monomethyl (or ethyl, propyl, isopropyl, n-butyl, isobutyl, tert-butyl, pentyl, n-hexyl, or 2-ethylhexyl) ether, dipropylene glycol monomethyl (or ethyl, propyl, isopropyl, n-butyl, isobutyl, tert-butyl, pentyl, n-hexyl, or 2-ethylhexyl) ether, and tripropylene glycol monomethyl (or ethyl, propyl, isopropyl, n-butyl, isobutyl, tert-butyl, pentyl, n-hexyl, or 2-ethylhexyl) ether; polyhydric alcohol dialkyl ethers, such as diethylene glycol dimethyl ether, diethylene glycol diethyl ether, diethylene glycol ethyl methyl ether, triethylene glycol dimethyl ether, triethylene glycol diethyl ether, triethylene glycol ethyl methyl ether, tetraethylene glycol dimethyl ether, tetraethylene glycol diethyl ether, tetraethylene glycol ethyl methyl ether, propylene glycol dimethyl ether, propylene glycol diethyl ether, propylene glycol ethyl methyl ether, dipropylene glycol dimethyl ether, dipropylene glycol diethyl ether, dipropylene glycol ethyl methyl ether, tripropylene glycol dimethyl ether, tripropylene glycol diethyl ether, and tripropylene glycol ethyl methyl ether; acetates, such as ethylene glycol monomethyl (or ethyl, propyl, isopropyl, n-butyl, isobutyl, tert-butyl, pentyl, n-hexyl, or 2-ethylhexyl) ether acetate, diethylene glycol monomethyl (or ethyl, propyl, isopropyl, n-butyl, isobutyl, tert-butyl, pentyl, n-hexyl, or 2-ethylhexyl) ether acetate, triethylene glycol monomethyl (or ethyl, propyl, isopropyl, n-butyl, isobutyl, tert-butyl, pentyl, n-hexyl, or 2-ethylhexyl) ether acetate, propylene glycol monomethyl (or ethyl, propyl, isopropyl, n-butyl, isobutyl, tert-butyl, pentyl, n-hexyl, or 2-ethylhexyl) ether acetate, dipropylene glycol monomethyl (or ethyl, propyl, isopropyl, n-butyl, isobutyl, tert-butyl, pentyl, n-hexyl, or 2-ethylhexyl) ether acetate, tripropylene glycol monomethyl (or ethyl, propyl, isopropyl, n-butyl, isobutyl, tert-butyl, pentyl, n-hexyl, or 2-ethylhexyl) ether acetate, ethylene glycol diacetate, diethylene glycol diacetate, propylene glycol diacetate, and dipropylene glycol diacetate; lactones, such as $\gamma$-butyrolactone, $\alpha$-methylene-$\gamma$-butyrolactone, $\epsilon$-caprolactone, $\gamma$-valerolactone, $\gamma$-hexanolactone, $\gamma$-heptanolactone, $\delta$-valerolactone, $\delta$-hexanolactone, $\delta$-heptalactone, $\delta$-octalactone, $\delta$-nonalactone, $\delta$-decalactone, $\delta$-undecalactone, $\gamma,\gamma$-dimethyl-$\gamma$-butyrolactone, $\alpha$-methyl-$\gamma$-butyrolactone, $\gamma$-crotolactone, $\alpha$-methylene-$\gamma$-butyrolactone, $\beta$-methyl-$\gamma$-butyrolactone, and 6-methylvalerolactone; carbonate esters, such as 2,3-butylene carbonate, ethylene carbonate, and propylene carbonate; oxazolidinone solvents, such as 3-methyl-2-oxazolidinone, 3-ethyl-2-oxazolidinone, and N-vinylmethyloxazolidinone; $C_1$ to $C_5$ alkyl alcohols, such as methyl alcohol, ethyl alcohol, n-propyl alcohol, isopropyl alcohol, n-butyl alcohol, sec-butyl alcohol, tert-butyl alcohol, isobutyl alcohol, and n-pentanol; monohydric alcohols, such as 3-methoxy-3-methyl-1-butanol, 3-methoxy-1-propanol, 1-methoxy-2-propanol, and 3-methoxy-n-butanol; ketones or keto alcohols, such as acetone and diacetone alcohol; ethers, such as tetrahydrofuran and dioxane; oxyethylene or oxypropylene copolymers, such as polyethylene glycol and polypropylene glycol; diols, such as ethylene glycol, propylene glycol, diethylene glycol, dipropylene glycol, 1,3-propanediol, isobutylene glycol, triethylene glycol, tripropylene glycol, tetraethylene glycol, 1,3-propanediol, 2-methyl-1,2-propanediol, 2-methyl-1,2-propanediol, 1,2-butanediol, 1,3-butanediol, 1,4-butanediol, 1,2-pentanediol, 1,2-hexanediol, 1,5-pentanediol, 1,6-hexanediol, 2-methyl-2,4-pentanediol, 3-methyl-1,3-butanediol, 3-methyl-1,5-pentanediol, and 2-methyl-2,4-pentanediol; triols, such as glycerol, trimethylolethane, trimethylolpropane, and 1,2,6-hexanetriol; tetrahydric alcohols, such as meso-erythritol and pentaerythritol; alkanolamines, such as monoethanolamine, diethanolamine, triethanolamine, N-methylethanolamine, N-ethylethanolamine, N-butylethanolamine, N-methyldiethanolamine, N-ethyldiethanolamine, and N-butyldiethanolamine; nitrogen-containing heterocyclic compounds, such as N-methyl-2-pyrrolidone, 2-pyrrolidone, and 1,3-dimethyl-2-imidazolidinone; cyclic compounds, such as $\gamma$-butyrolactone and sulfolane; morpholines, such as N-methylmorpholine, N-ethylmorpholine, and N-formylmorpholine; and terpene solvents. In particular, the water-soluble solvent is preferably selected so as to allow the pretreatment ink to have a desired static surface tension, and for example, 1,2-pentanediol or 1,2-butanediol is preferably used.

The content of the water-soluble solvent in the pretreatment ink may be any suitable level that allows dispersion or dissolution of each component. The content of the water-soluble solvent in the pretreatment ink preferably has a lower limit of 5 mass % or more, more preferably 10 mass % or more, even more preferably 12 mass % or more, based on the total mass of the pretreatment ink. The content of the water-soluble solvent in the pretreatment ink preferably has an upper limit of 50 mass % or less, more preferably 45 mass % or less, even more preferably 40 mass % or less, based on the total mass of the pretreatment ink.

Surfactant

The pretreatment ink may contain a surfactant. The addition of the surfactant can control the surface tension of the pretreatment ink to a level in an appropriate range. For example, the surfactant is preferably, but not limited to, a nonionic surfactant, a fluorinated surfactant, an acetylene glycol surfactant, or a silicone (silicon) surfactant.

Examples of the nonionic surfactant include NOIGEN, EPAN, and SORGEN (all manufactured by DKS Co., Ltd.), EMULGEN, AMIET, and EMASOL (all manufactured by Kao Corporation), and NAROACTY, EMULMIN, and SANNONIC (all manufactured by Sanyo Chemical Industries, Ltd.).

Examples of the fluorinated surfactant include MEGAFACE F-114, F-410, F-440, F-447, F-553, and F-556 (manufactured by DIC Corporation), and SURFLON S-211, S-221, S-231, S-233, 5-241, S-242, S-243, S-420, S-661, S-651, and S-386 (manufactured by AGC Seimi Chemical Co., Ltd.).

Examples of the acetylene glycol surfactant include SURFYNOL 104, 82, 420, 440, 465, 485, TG, and 2502, and DYNOL 604, 607, and 960 (all acetylene glycol surfactants manufactured by Evonik Industries), OLFINE E1004, E1010, PD004, and EXP4300 (all acetylene glycol surfactants manufactured by Nissin Chemical Co., Ltd.), and ACETYLENOL EH, E40, E60, E81, E100, E200 (all acetylene glycol surfactants manufactured by Kawaken Fine Chemicals Co., Ltd.).

Examples of the silicone (silicon) surfactant include FZ-2122, FZ-2110, FZ-7006, FZ-2166, FZ-2164, FZ-7001, FZ-2120, SH-8400, FZ-7002, FZ-2104, 8029 ADDITIVE, 8032 ADDITIVE, 57 ADDITIVE, 67 ADDITIVE, and 8616 ADDITIVE (all manufactured by Dow Toray Co., Ltd.), KF-6012, KF-6015, KF-6004, KF-6013, KF-6011, KF-6043, KP-104, KP-110, KP-112, KP-323, KP-341, and KP-6004 (all manufactured by Shin-Etsu Chemical Co., Ltd.), BYK-300, BYK-302, BYK-306, BYK-307, BYK-320, BYK-325, BYK-330, BYK-331, BYK-333, BYK-337, BYK-341, BYK-344, BYK-345, BYK-346, BYK-347, BYK-348, BYK-349, BYK-3420, BYK-3450, BYK-3451, BYK-3456, BYK-375, BYK-377, BYK-378, BYK-UV3500, BYK-UV3510, BYK-310, BYK-315, BYK-370, BYK-UV3570, BYK-322, BYK-323, BYK-350, BYK-352, BYK-354, BYK-355, BYK-358N, BYK-361N, BYK-380N, BYK-381, BYK-392, BYK-340, BYK-Silclean 3700, and BYK-Dynwet 800 (all manufactured by BYK-Chemie), SILFACE SAG002, SILFACE SAG005, SILFACE SAG008, SILFACE SAG014, SILFACE SAG503A, SILFACE SJM-002, and SILFACE SJM-003 (all manufactured by Nissin Chemical Co., Ltd.), and TEGO FLOW 425, TEGO Glide 100, 110, 130, 410, 432, 440, 450, 482, 490, 492, 494, 496, and ZG400, TEGO Twin 4000, TEGO Twin 4100, TEGO Twin 4200, TEGO Wet 240, TEGO Wet 250, and TEGO Wet 240, KL245, 250, 260, 265, 270, and 280 (all manufactured by Evonik Industries).

An anionic surfactant may also be used. However, it is preferred to check whether the anionic surfactant to be used is compatible with the pretreatment ink containing a cationic compound.

If used, the anionic surfactant should be one compatible with the pretreatment ink, such as one selected from EMAL, LATEMUL, PELEX, NEOPELEX, and DEMOL (all manufactured by Kao Corporation), and SUNNOL, LIPOLAN, LIPON, and LIPAL (all manufactured by Lion Corporation).

The surfactants shown above may be used alone, or two or more of the surfactants shown above may be used in combination. The content of the surfactant in the pretreatment ink may be appropriately adjusted depending on its compatibility with the ink, cleaning performance, wettability on channel inner walls, and ink jettability.

The content of the surfactant in the pretreatment ink may be any level as long as the static surface tensions of the respective inks fall within the specified range. The content of the surfactant in the pretreatment ink preferably has a lower limit of 0.50 mass % or more, more preferably 0.60 mass % or more, even more preferably 0.70 mass % or more, based on the total mass of the pretreatment ink. The content of the surfactant in the pretreatment ink preferably has an upper limit of 5.0 mass % or less, more preferably 4.0 mass % or less, even more preferably 3.0 mass % or less, based on the total mass of the pretreatment ink.

Other Components

If necessary, the pretreatment ink may further contain a conventionally known additive. Examples of such an additive include a viscosity modifier, a pH adjuster, an antioxidant, a preservative, an antifungal agent, and so on.

The pretreatment ink may be prepared by any suitable method. For example, such a method includes adding the resin, the surfactant, and optionally other components to the water-soluble solvent to form the pretreatment ink.

The surface tension of the pretreatment ink may be any level as long as the static surface tensions of the respective inks fall within the specified range. The surface tension of the pretreatment ink preferably has an upper limit of 30.0 mN/m or less, more preferably 29.0 mN/m or less, even more preferably 28.0 mN/m or less. The surface tension of the pretreatment ink preferably has a lower limit of 20.0 mN/m or more, more preferably 21.0 mN/m or more, even more preferably 22.0 mN/m or more. In this regard, the surface tension is the value measured at a temperature of 25° C. by the Wilhelmy method (equipment: Model DY-300 manufactured by Kyowa Interface Science Co., Ltd.).

The surface tension of the pretreatment ink can be adjusted to fall within the specified range by controlling the type and content of the water-soluble solvent and the surfactant for the pretreatment ink.

Water-Based Ink

The water-based ink is an ink to be jetted onto the pretreatment ink landed on the substrate. The water-based ink includes water as a main component and may include a colorant. The water-based ink, in which water is a main component, has less impact on the environment and is non-flammable and highly safe for workers.

The colorant may be a dye or pigment commonly used for ink compositions. Examples of the pigment include inorganic pigments, organic pigments, and so on. These pigments may be used alone, or two or more of these pigments may be used in combination. In a case where a pigment is used to form the water-based ink according to this embodiment, a dispersant or a dispersion aid (pigment derivative) may be used to increase the dispersion stability of the pigment.

The colorant may be any type, such as one conventionally used for yellow, magenta, cyan, black, white, light magenta, light cyan, orange, or any other color.

The water-based ink may be a colorant-free clear ink or a colorant-containing, coloring ink. A colorant-containing, water-based ink may significantly bleed to cause appearance deterioration. However, using the ink set according to this embodiment, in which the static surface tensions of the respective inks are controlled to fall within the specified range, will effectively prevent the colorant-containing, water-based ink from bleeding and causing appearance deterioration.

The pigment may be one used for inkjet ink in the conventional art, such as barium sulfate, iron oxide, zinc oxide, barium carbonate, barium sulfate, silica, clay, talc, titanium oxide, calcium carbonate, synthetic mica, alumina, or any other inorganic pigment, or an organic pigment. These pigments may be used alone, or two or more of these pigments may be used in combination. Examples of the organic pigment include insoluble azo pigments, soluble azo pigments, dye derivatives, phthalocyanine organic pigments, quinacridone organic pigments, perylene organic pigments, perinone organic pigments, azomethine organic pigments, anthraquinone organic pigments (anthrone organic pigments), xanthene organic pigments, diketopyrrolopyrrole organic pigments, dioxazine organic pigments, nickel azo pigments, isoindolinone organic pigments, pyranthrone organic pigments, thioindigo organic pigments, condensed azo compound organic pigments, benzimidazolone organic pigments, quinophthalone organic pigments, isoindoline organic pigments, organic solid solution pigments, such as quinacridone solid solution pigments and perylene solid solution pigments, and other pigments, such as lake pigments and carbon black.

Examples of the organic pigment shown in Color Index (C.I.) number include C.I. Pigment Yellow 1, 2, 3, 12, 13, 14, 16, 17, 20, 24, 73, 74, 75, 83, 93, 95, 97, 98, 109, 110, 114, 117, 120, 125, 128, 129, 130, 137, 138, 139, 147, 148, 150, 151, 153, 154, 155, 166, 168, 180, 185, 213, and 214, C.I. Pigment Red 5, 7, 9, 12, 48, 49, 52, 53, 57:1, 97, 112, 122, 123, 146, 149, 150, 168, 177, 180, 184, 192, 202, 206, 208, 209, 215, 216, 217, 220, 223, 224, 226, 227, 228, 238, 240, 254, 255, 269, and 291, C.I. Pigment Orange 16, 36, 43, 51, 55, 59, 61, 64, 71, and 73, C.I. Pigment Violet 19, 23, 29, 30, 37, 40, and 50, C.I. Pigment Blue 15, 15:1, 15:3, 15:4, 15:6, 16, 22, 60, and 64, C.I. Pigment Green 7, 36, 58, 59, 62, and 63, C.I. Pigment Brown 23, 25, and 26, and C.I. Pigment Black 7.

Examples of the dye for use in the water-based ink according to this embodiment include azo dyes, benzoquinone dyes, naphthoquinone dyes, anthraquinone dyes, cyanine dyes, squarylium dyes, croconium dyes, merocyanine dyes, stilbene dyes, diarylmethane dyes, triarylmethane dyes, fluoran dyes, spiropyran dyes, phthalocyanine dyes, indigo dyes such as indigoid, fulgide dyes, nickel complex dyes, and azulene dyes.

Examples of the inorganic pigment include titanium oxide, barium sulfate, calcium carbonate, zinc oxide, lead sulfate, lead yellow, zinc yellow, rouge (red iron(III) oxide), cadmium red, ultramarine, ferric hexacyanoferrate, chromic oxide green, cobalt green, amber, titanium black, synthetic iron black, and inorganic solid solution pigments.

The pigment may be in the form of particles with any average dispersion diameter that allows the desired color to be produced. For good dispersion stability and sufficient coloring power, the average dispersion diameter of the pigment particles preferably has a lower limit of 10 nm or more, more preferably 20 nm or more, even more preferably 30 nm or more, while the average dispersion diameter depends on the type of the pigment.
The average dispersion diameter of the pigment particles preferably has an upper limit of 300 nm or less, more preferably 250 nm or less, even more preferably 200 nm or less. With an average dispersion diameter of 300 nm or less, the pigment particles will be less likely to cause inkjet head nozzle clogging and will form homogeneous images with high reproducibility. With an average dispersion diameter of 10 nm or more, the pigment particles can form printed products with good lightfastness. In this embodiment, the average dispersion diameter of the pigment particles is the average particle size (D50) measured under conditions at 25° C. using a fiber optics particle size analyzer (Model FPAR-1000 manufactured by Otsuka Electronics Co., Ltd.).

The pigment content of the water-based ink may be any level that allows the formation of the desired image and may be adjusted as needed. Specifically, the pigment content of the water-based ink preferably has a lower limit of 0.05 mass % or more, more preferably 0.08 mass % or more, even more preferably 0.1 mass % or more, based on the total mass of the water-based ink, while it depends on the type of the pigment. The pigment content of the water-based ink preferably has an upper limit of 20 mass % or less, more preferably 15 mass % or less, even more preferably 10 mass % or less, based on the total mass of the water-based ink. With a pigment content of 0.05 mass % or more or 20 mass % or less, the water-based ink can have a good balance between pigment dispersion stability and coloring power.

Pigment Dispersant

The water-based ink according to this embodiment may contain a pigment dispersant. As used herein, the term "pigment dispersant" refers to a resin or surfactant that can adhere to part of the pigment surface and function to increase the dispersibility of the pigment in the ink.

The water-based ink according to this embodiment may contain any type of pigment dispersant. For example, the pigment dispersant may be a cationic surfactant, an anionic surfactant, a nonionic surfactant, an amphoteric surfactant, a silicone (silicon) surfactant, or a fluorinated surfactant. In particular, the surfactant is preferably a polymer surfactant (polymer dispersant), such as that shown below.

The pigment dispersant, which the water-based ink according to this embodiment may contain, is preferably a water-soluble polymer dispersant. Examples of the water-soluble polymer dispersant include dispersants having a polyester main chain, a polyacrylic main chain, a polyurethane main chain, a polyamine main chain, or a polycaprolactone main chain and a side chain having a polar group, such as amino, carboxy, sulfo, or hydroxy. Examples include (co)polymers of unsaturated carboxylic acid esters, such as polyacrylic acid esters; copolymers of an aromatic vinyl compound, such as styrene or α-methylstyrene, and an unsaturated carboxylic acid ester, such as an acrylic acid ester; (partial) amine salts, (partial) ammonium salts, or (partial) alkylamine salts of (co)polymers of an unsaturated carboxylic acid, such as polyacrylic acid; copolymers of a hydroxyl-containing unsaturated carboxylic acid ester, such as hydroxyl-containing polyacrylic acid esters, and modifications thereof; polyurethanes; unsaturated polyamides; polysiloxanes; long-chain polyaminoamide phosphates; polyethyleneimine derivatives (amides resulting from the reaction of poly(lower alkylene imine) with free carboxyl-containing polyester, and bases thereof); and polyallylamine derivatives (reaction products resulting from the reaction of polyallylamine with one or more compounds selected from the three compounds: free carboxyl-containing polyester, free-carboxyl-containing polyamide, and a free-carboxyl-containing ester-amide condensation product (polyester amide). In particular, a water-soluble polymer dispersant including (meth)acrylic resin is preferred for ink dispersion stability and printed image clarity.

Examples of the water-soluble polymer dispersant include SMA 1440, SMA 2625, SMA 17352, SMA 3840, SMA 1000, SMA 2000, and SMA 3000 manufactured by Cray Valley; JONCRYL 67, JONCRYL 678, JONCRYL 586, JONCRYL 611, JONCRYL 680, JONCRYL 682, JONCRYL 690, JONCRYL 819, JONCRYL-JDX 5050, EFKA 4550, EFKA 4560, EFKA 4585, EFKA 5220, EFKA 6230, and Dispex Ultra PX 4575 manufactured by BASF Japan; SOLSPERSE 20000, SOLSPERSE 27000, SOLSPERSE 40000, SOLSPERSE 41000, SOLSPERSE 41090, SOLSPERSE 43000, SOLSPERSE 44000, SOLSPERSE 45000, SOLSPERSE 46000, SOLSPERSE 47000, SOLSPERSE 53095, SOLSPERSE 54000, SOLSPERSE 64000, SOLSPERSE 65000, SOLSPERSE 66000, SOLSPERSE J400, SOLSPERSE W100, SOLSPERSE W200, SOLSPERSE W320, and SOLSPERSE WV400 manufactured by The Lubrizol Corporation; ANTI-TERRA-250, BYKJET-9150, BYKJET-9151, BYKJET-9152, BYKJET-9170, DISPERBYK-102, DISPERBYK-168, DISPERBYK-180, DISPERBYK-184, DISPERBYK-185, DISPERBYK-187, DISPERBYK-190, DISPERBYK-191, DISPERBYK-193, DISPERBYK-194N, DISPERBYK-198, DISPERBYK-199, DISPERBYK-2010, DISPERBYK-2012, DISPERBYK-2013, DISPERBYK-2014, DISPERBYK-2015, DISPERBYK-2018, DISPERBYK-2019, DISPERBYK-2055, DISPERBYK-2060, DISPERBYK-2061, DISPERBYK-2081, and DISPERBYK-2096 manufactured by BYK-Chemie; TEGO DISPERS 650, TEGO DISPERS 651, TEGO DISPERS 652, TEGO DISPERS 655, TEGO DISPERS 660C, TEGO DISPERS 670, TEGO DISPERS 715W, TEGO DISPERS 740W, TEGO DISPERS 741W, TEGO DISPERS 750W, TEGO DISPERS 752W, TEGO DISPERS 755W, TEGO DISPERS 757W, TEGO DISPERS 760W, TEGO DISPERS 761W, TEGO DISPERS 765W, ZETASPERSE 170, ZETASPERSE 179, ZETASPERSE 182, ZETASPERSE 3100, ZETASPERSE 3400, ZETASSPERSE 3700, and ZETASPERSE 3800 manufactured by Evonik Industries; and SN-DISPERSANT 2010, SN-DISPERSANT 2060, SN-DISPERSANT 4215, SN-DISPERSANT 5027, SN-DISPERSANT 5029, SN-DISPERSANT 5034, SN-DISPERSANT 5468, NOPCALL 5200, NOPCOSANT K, NOPCOSANT R, NOPCOSPERSE 44-C, NOPCOSPERSE 6100, and NOPCOSPERSE 6150 manufactured by San Nopco Limited. These pigment dispersants can be advantageously used for the water-based ink according to this embodiment.

The pigment for use in the water-based ink according to this embodiment may be in the form of a pigment dispersion, which contains the pigment dispersed with the aid of the pigment dispersant in the water-soluble solvent. Alternatively, the pigment for use in the water-based ink according to this embodiment may be a self-dispersing pigment with its surface modified directly with a hydrophilic group. Such a self-dispersing pigment may be in the form of a pigment dispersion. In this embodiment, the pigment for use in the inkjet recording ink may include a combination of organic pigments as shown above, a combination of inorganic pigments as shown above, or a combination of organic and inorganic pigments as shown above, or may include a combination of a self-dispersing pigment and a pigment dispersion, which includes the pigment dispersed with the aid of the pigment dispersant in the water-soluble solvent as mentioned above. In particular, the pigment for the ink set according to this embodiment is preferably free of any self-dispersing pigment. In that case, the water-based ink can be effectively prevented from causing cissing. While the reason for this is not necessarily clear, a possible speculation is that in that case, the water-based ink can exhibit adequate wetting and spreading behavior to successfully infiltrate into the substrate so that it can be effectively prevented from causing cissing.

Water

The water-based ink contains water as a main component. The water is preferably deionized water or any other type of water free of various types of ions. The content of water in the water-based ink may be any suitable level that allows dispersion or dissolution of each component. The content of water in the water-based ink preferably has a lower limit of 30 mass % or more, more preferably 45 mass % or more, even more preferably 50 mass % or more, based on the total mass of the water-based ink. The content of water in the water-based ink preferably has an upper limit of 85 mass % or less, more preferably 80 mass % or less, even more preferably 75 mass % or less, based on the total mass of the water-based ink.

Water-Soluble Solvent

The water-based ink according to this embodiment may contain a water-soluble solvent. The water-soluble solvent should be a solvent capable of dispersing or dissolving the colorant and any other component.

Examples of the water-soluble solvent include $C_1$ to $C_5$ alkyl alcohols, such as methyl alcohol, ethyl alcohol, n-propyl alcohol, isopropyl alcohol, n-butyl alcohol, sec-butyl alcohol, tert-butyl alcohol, isobutyl alcohol, and n-pentanol; monohydric alcohols, such as 3-methoxy-3-methyl-1-butanol, 3-methoxy-1-propanol, 1-methoxy-2-propanol, and 3-methoxy-n-butanol; amides, such as formamide, acetamide, propanamide, butanamide, isobutylamide, pentanamide, N-methylformamide, N-methylacetamide, N-methylpropanamide, N-methylbutanamide, N-methylisobutylamide, N-methylpentanamide, N-ethylformamide, N-ethylacetamide, N-ethylpropanamide, N-ethylbutanamide, N-ethylisobutylamide, N-ethylpentanamide, N-propylformamide, N-propylisobutylamide, N-propylpentanamide, N-isopropylformamide, N-isopropylacetamide, N-isopropylpropanamide, N-isopropylbutanamide, N-isopropylisobutylamide, N-isopropylpentanamide, N-butylformamide, N-butylacetamide, N-butylpropanamide, N-butylbutanamide, N-butylisobutylamide, N-butylpentanamide, N,N-dimethylformamide, N,N-dimethylacetamide, N,N-dimethylpropanamide, N,N-dimethylbutanamide, N,N-dimethylisobutylamide, N,N-dimethylpentanamide, N,N-diethylformamide, N,N-diethylacetamide, N,N diethylpropanamide, N,N-diethylbutanamide, N,N-diethylisobutylamide, N,N-diethylpentanamide, N,N-dipropylformamide, N,N-dipropylacetamide, N,N-dipropylpropanamide, N,N-dipropylbutanamide, N,N-dipropylisobutylamide, N,N-dipropylpentanamide, N,N-diisopropylformamide, N,N-diisopropylacetamide, N,N-diisopropylpropanamide, N,N-diisopropylbutanamide, N,N-diisopropylisobutylamide, N,N-diisopropylpentanamide, N,N-dibutylformamide, N,N-dibutylacetamide, N,N-dibutylpropanamide, N,N-dibutylbutanamide, N,N-dibutylisobutylamide, N,N-dibutylpentanamide, N-ethyl-N-methylformamide, N-ethyl-N-methylacetamide, N-ethyl-N-methylpropanamide, N-ethyl-N-methylbutanamide, N-ethyl-N-methylisobutylamide, N-ethyl-N-methylpentanamide, N-methyl-N-propylformamide, N-methyl-N-propylacetamide, N-methyl-N-propylpropanamide, N-methyl-N-propylbutanamide, N-methyl-N-propylformamide, N-ethyl-N-propylacetamide, N-ethyl-N-propylpropanamide, N-ethyl-N-propylbutanamide, N-ethyl-N-propylisobutylamide, and N-ethyl-N-propylpentanamide; ketones or keto alcohols, such as acetone and diacetone alcohol; ethers, such as tetrahydrofuran and dioxane; oxyethylene or oxypropylene copolymers, such as polyethylene glycol and polypropylene glycol; diols, such as ethylene glycol, propylene glycol, diethylene glycol, dipropylene glycol, 1,3-propanediol, isobutylene glycol, triethylene glycol, tripropylene glycol, tetraethylene glycol, 1,3-propanediol, 2-methyl-1,2-propanediol, 2-methyl-1,2-propanediol, 1,2-butanediol, 1,3-butanediol, 1,4-butanediol, 1,2-pentanediol, 1,3-pentanediol, 1,2-hexanediol, 1,5-pentanediol, 1,6-hexanediol, 2-methyl-2,4-pentanediol, 3-methyl-1,3-butanediol, 3-methyl-1,5-pentanediol, and 2-methyl-2,4-pentanediol; triols, such as glycerol, trimethylolethane, trimethylolpropane, and 1,2,6-hexanetriol; tetrahydric alcohols, such as meso-erythritol and pentaerythritol; monoalkyl ethers, such as ethylene glycol monomethyl (or ethyl, isopropyl, n-butyl, isobutyl, n-hexyl, or 2-ethylhexyl) ether, diethylene glycol monomethyl (or ethyl, isopropyl, n-butyl, isobutyl, n-hexyl, or 2-ethylhexyl) ether, triethylene glycol monomethyl (or ethyl, propyl, isopropyl, n-butyl, isobutyl, tert-butyl, pentyl, n-hexyl, or 2-ethylhexyl) ether, propylene glycol monomethyl (or ethyl, propyl, isopropyl, n-butyl, isobutyl, tert-butyl, pentyl, n-hexyl, or 2-ethylhexyl) ether, dipropylene glycol monomethyl (or ethyl, propyl, isopropyl, n-butyl, isobutyl, tert-butyl, pentyl, n-hexyl, or 2-ethylhexyl) ether, and tripropylene glycol monomethyl (or ethyl, propyl, isopropyl, n-butyl, isobutyl, tert-butyl, pentyl, n-hexyl, or 2-ethylhexyl) ether; polyhydric alcohol dialkyl ethers, such as diethylene glycol dimethyl ether, diethylene glycol diethyl ether, diethylene glycol ethyl methyl ether, triethylene glycol dimethyl ether, triethylene glycol diethyl ether, triethylene glycol ethyl methyl ether, tetraethylene glycol dimethyl ether, tetraethylene glycol diethyl ether, tetraethylene glycol ethyl methyl ether, propylene glycol dimethyl ether, propylene glycol diethyl ether, propylene glycol ethyl methyl ether, dipropylene glycol dimethyl ether, dipropylene glycol diethyl ether, dipropylene glycol ethyl methyl ether, tripropylene glycol dimethyl ether, tripropylene glycol diethyl ether, and tripropylene glycol ethyl methyl ether; acetates, such as ethylene glycol monomethyl (or ethyl, propyl, isopropyl, n-butyl, isobutyl, tert-butyl, pentyl, n-hexyl, or 2-ethylhexyl) ether acetate, diethylene glycol monomethyl (or ethyl, propyl, isopropyl, n-butyl, isobutyl, tert-butyl, pentyl, n-hexyl, or 2-ethylhexyl) ether acetate, triethylene glycol monomethyl (or ethyl, propyl, isopropyl, n-butyl, isobutyl, tert-butyl, pentyl, n-hexyl, or 2-ethylhexyl) ether acetate, propylene glycol monomethyl (or ethyl, propyl, isopropyl, n-butyl, isobutyl, tert-butyl, pentyl, n-hexyl, or 2-ethylhexyl) ether acetate, dipropylene glycol monomethyl (or ethyl, propyl, isopropyl, n-butyl, isobutyl, tert-butyl, pentyl, n-hexyl, or 2-ethylhexyl) ether acetate, tripropylene glycol monomethyl (or ethyl, propyl, isopropyl, n-butyl, isobutyl, tert-butyl, pentyl, n-hexyl, or 2-ethylhexyl) ether acetate, ethylene glycol diacetate, diethylene glycol diacetate, propylene glycol diacetate, and dipropylene glycol diacetate; lactones, such as γ-butyrolactone, α-methylene-γ-butyrolactone, ε-caprolactone, γ-valerolactone, γ-hexanolactone, γ-heptanolactone, δ-valerolactone, δ-hexanolactone, δ-heptalactone, δ-octalactone, δ-nonalactone, δ-decalactone, δ-undecalactone, γ,γ-dimethyl-γ-butyrolactone, α-methyl-γ-butyrolactone, γ-crotolactone, α-methylene-γ-butyrolactone, β-methyl-γ-butyrolactone, and 6-methylvalerolactone; carbonate esters, such as 2,3-butylene carbonate, ethylene carbonate, and propylene carbonate; oxazolidinone solvents, such as 3-methyl-2-oxazolidinone, 3-ethyl-2-oxazolidinone, and N-vinylmethyloxazolidinone; $C_1$ to $C_5$ alkyl alcohols, such as methyl alcohol, ethyl alcohol, n-propyl alcohol, isopropyl alcohol, n-butyl alcohol, sec-butyl alcohol, tert-butyl alcohol, isobutyl alcohol, and n-pentanol; monohydric alcohols, such as 3-methoxy-3-methyl-1-butanol, 3-methoxy-1-propanol, 1-methoxy-2-propanol, and 3-methoxy-n-butanol; ketones or keto alcohols, such as acetone and diacetone alcohol; ethers, such as tetrahydrofuran and dioxane; oxyethylene or oxypropylene copolymers, such as polyethylene glycol and polypropylene glycol; diols, such as ethylene glycol, propylene glycol, diethylene glycol, dipropylene glycol, 1,3-propanediol, isobutylene glycol, triethylene glycol, tripropylene glycol, tetraethylene glycol, 1,3-propanediol, 2-methyl-1,2-propanediol, 2-methyl-1,2-propanediol, 1,2-butanediol, 1,3-butanediol, 1,4-butanediol, 1,2-pentanediol, 1,2-hexanediol, 1,5-pentanediol, 1,6-hexanediol, 2-methyl-2,4-pentanediol, 3-methyl-1,3-butanediol, 3-methyl-1,5-pentanediol, and 2-methyl-2,4-pentanediol; triols, such as glycerol, trimethylolethane, trimethylolpropane, and 1,2,6-hexanetriol; tetrahydric alcohols, such as meso-erythritol and pentaerythritol; alkanolamines, such as monoethanolamine, diethanolamine, triethanolamine, N-methylethanolamine, N-ethylethanolamine, N-butylethanolamine, N-methyldiethanolamine, N-ethyldiethanolamine, and N-butyldiethanolamine; nitrogen-containing heterocyclic compounds, such as N-methyl-2-pyrrolidone, 2-pyrrolidone, and 1,3-dimethyl-2-imidazolidinone; cyclic compounds, such as γ-butyrolactone and sulfolane; morpholines, such as N-methylmorpholine, N-ethylmorpholine, and N-formylmorpholine; and terpene solvents. In particular, the water-soluble solvent is preferably selected so as to allow the water-based ink to have a desired static surface tension, and for example, 1,3-pentanediol or propylene glycol is preferably used.

The content of the water-soluble solvent in the water-based ink may be any suitable level that allows dispersion or dissolution of each component. The content of the water-soluble solvent in the water-based ink preferably has a lower limit of 5 mass % or more, more preferably 10 mass % or more, even more preferably 12 mass % or more, based on the total mass of the water-based ink. The content of the water-soluble solvent in the water-based ink preferably has an upper limit of 50 mass % or less, more preferably 45 mass % or less, even more preferably 40 mass % or less, based on the total mass of the water-based ink.

Resin

The water-based ink according to this embodiment may contain a resin. When added to the water-based ink, the resin can inhibit infiltration of the pigment into the substrate (recording medium) and promote the fixing of the colorant. For high fixing ability and high print water resistance, the resin is preferably in the form of a resin emulsion. In the form of a resin emulsion, the resin can disperse as fine particles in the water-based ink thanks to steric and electrostatic repulsive forces.

Specifically, the resin may be at least one resin or copolymer resin selected from the group consisting of acrylic resin, styrene-acrylic resin, polyurethane resin, polyester resin, vinyl chloride resin, vinyl acetate resin, polyether resin, vinyl chloride-vinyl acetate copolymer resin, polyethylene resin, acrylamide resin, epoxy resin, polycarbonate resin, silicone resin, and polystyrene resin, or any mixture thereof. These resins are preferred because they can provide higher levels of water resistance and solvent resistance. In particular, the resin preferably includes acrylic resin, which has at least one monomer unit that forms an acrylic skeleton, or acrylic copolymer resin, so that the resin can provide high ejection stability, water resistance, and solvent resistance.

Examples of the commercially available resin emulsion include, but are not limited to, ACRIT WEM-031U, WEM-200U, WEM-321, WEM-3000, WEM-202U, and WEM-3008 (acrylic-urethane resin emulsions manufactured by Taisei Fine Chemical Co., Ltd.); ACRIT UW-550CS, UW-223SX, AKW-107, and RKW-500 (acrylic resin emulsions manufactured by Taisei Fine Chemical Co., Ltd.); LUBRIJET N240 (acrylic resin emulsion manufactured by The Lubrizol Corporation); SUPERFLEX 150, 210, 470, 500M, 620, 650, E2000, E4800, and R5002 (urethane resin emulsions manufactured by DKS Co., Ltd.); VINYBLAN 701 FE35, 701 FE50, 701 FE65, 700, 701, 711, 737, and 747 (vinyl chloride-acrylic resin emulsions manufactured by Nissin Chemical Industry Co., Ltd.); VINYBLAN 2706 and 2685 (acrylic resin emulsions manufactured by Nissin Chemical Industry Co., Ltd.); MOVINYL 743N, 6520, 6600, 6820, 7470, and 7720 (acrylic resin emulsions manufactured by Japan Coating Resin Co., Ltd.); PRIMAL AC-261P and AC-818 (acrylic resin emulsions manufactured by The Dow Chemical Company); JE-1056 (acrylic resin emulsion manufactured by Seiko PMC Corporation); NeoCryl A2091, A2092, A639, A655, and A662 (styrene-acrylic resin emulsions manufactured by DSM Coating Resins Ltd.); QE-1042 and KE-1062 (styrene-acrylic resin emulsions manufactured by Seiko PMC Corporation); JON-CRYL 7199 and PDX-7630A (styrene-acrylic resin emulsions manufactured by BASF Japan); CHALINE R 170BX (silicone-acrylic resin emulsion manufactured by Nissin Chemical Industry Co., Ltd.); TAKELAC W-6010 (urethane resin emulsion manufactured by Mitsui Chemicals, Inc.); Elitel KA-5071S (polyester resin emulsion manufactured by Unitika Ltd.); and Polysol AP-1350 (acrylic resin emulsion manufactured by Showa Denko).

The content of the resin (resin emulsion) in the water-based ink may be any suitable level. The content of the resin (resin emulsion) in the water-based ink preferably has a lower limit of 0.05 mass % or more, more preferably 0.1 mass % or more, even more preferably 0.5 mass % or more, furthermore preferably 1 mass % or more, based on the total mass of the water-based ink. The content of the resin in the water-based ink preferably has an upper limit of 15 mass % or less, more preferably 12 mass % or less, even more preferably 10 mass % or less, based on the total mass of the water-based ink.

The resin emulsion preferably has an average particle size of 30 nm or more, more preferably 40 nm or more, even more preferably 50 nm or more, for its dispersion stability in the ink composition and for ink jettability. The resin emulsion preferably has an average particle size of 300 nm or less, more preferably 270 nm or less, even more preferably 250 nm or less, for its dispersion stability in the ink composition and for ink jettability. In this embodiment, the number-average particle size of the pigment can be measured at a temperature of 25° C. using a fiber optics particle size analyzer (Model FPAR-1000 manufactured by Otsuka Electronics Co., Ltd.).

For film water resistance, the resin emulsion preferably has a mass average molecular weight of 10,000 or more, more preferably 50,000 or more, even more preferably 100,000 or more. For ink composition stability, the resin emulsion preferably has a mass average molecular weight of 1,000,000 or less, more preferably 700,000 or less, even more preferably 500,000 or less. In this embodiment, the molecular weight of the resin refers to the mass average molecular weight Mw, which is the value measured by GPC (gel permeation chromatography). The mass average molecular weight Mw may be determined using HLC-8120GPC manufactured by Tosoh Corporation and polystyrene standards for calibration curve.

Surfactant

The water-based ink according to this embodiment may contain a surfactant. The addition of the surfactant can control the surface tension of the water-based ink to a level in an appropriate range. For example, the surfactant is preferably, but not limited to, an anionic surfactant, a nonionic surfactant, a silicone (silicon) surfactant, a fluorinated surfactant, or an acetylene glycol surfactant, which has a high ability to control surface tension.

Examples of the surfactant include EMAL, LATEMUL, PELEX, NEOPELEX, and DEMOL (all anionic surfactants manufactured by Kao Corporation), SUNNOL, LIPOLAN, LIPON, and LIPAL (all anionic surfactants manufactured by Lion Corporation), NOIGEN, EPAN, and SORGEN (all nonionic surfactants manufactured by DKS Co., Ltd.), EMULGEN, AMIET, and EMASOL (all nonionic surfactants manufactured by Kao Corporation), NAROACTY, EMULMIN, and SANNONIC (all nonionic surfactants manufactured by Sanyo Chemical Industries, Ltd.), SURFYNOL 104, 82, 420, 440, 465, 485, TG, 2502, SE-F, and 107L, and DYNOL 360, 604, and 607 (all acetylene glycol surfactants manufactured by Evonik Industries), DYNOL 960 (a blend of acetylene glycol and silicone surfactants, manufactured by Evonik Industries), SURFYNOL AD01 (alkane glycol surfactant manufactured by Evonik Industries), OLFINE E1004, E1010, PD004, and EXP4300 (all acetylene glycol surfactants manufactured by Nissin Chemical Co., Ltd.), MEGAFACE (fluorinated surfactant manufactured by DIC Corporation), SURFLON (fluorinated surfactant manufactured by AGC Seimi Chemical Co., Ltd.), BYK 302, 306, 307, 331, 333, 345, 346, 347, 348, 349, 3420, 3450, 3451, 3455, and 3456 (all silicone (silicon) surfactants manufactured by BYK-Chemie), KP-110, KP-112, KP-323, KP-341, and KP-6004 (all silicone (silicon) surfactants manufactured by Shin-Etsu Chemical Co., Ltd.), SILFACE SAG002, SILFACE SAG005, SILFACE SAG008, SILFACE SAG014, SILFACE SAG503A, SILFACE SJM-002, and SILFACE SJM-003 (all silicone (silicon) surfactants manufactured by Nissin Chemical Co., Ltd.), TEGO FLOW 425, TEGO Glide 100, 110, 130, 410, 432, 440, 450, 482, 490, 492, 494, 496, ZG400, TEGO Twin 4000, TEGO Twin 4100, TEGO Twin 4200, TEGO Wet 240, TEGO Wet 250, and TEGO Wet 240, KL245, 250, 260, 265, 270, and 280 (all silicone (silicon) surfactants manufactured by Evonik Industries), and TEGO Wet 500, 505, 510, and 520 (all nonionic surfactants manufactured by Evonik Industries).

The content of the surfactant in the water-based ink may be any level as long as the static surface tensions of the respective inks fall within the specified range. The content of the surfactant in the water-based ink preferably has a lower limit of 0.30 mass % or more, more preferably 0.40 mass % or more, even more preferably 0.50 mass % or more, based on the total mass of the water-based ink. The content of the surfactant in the water-based ink preferably has an upper limit of 5.0 mass % or less, more preferably 4.0 mass % or less, even more preferably 3.0 mass % or less, based on the total mass of the water-based ink.

Other Components

If necessary, the water-based ink may further contain a conventionally known additive. Examples of such an additive include wax, a viscosity modifier, a pH adjuster, an antioxidant, a preservative, an antifungal agent, and so on.

Examples of the method for preparing the water-based ink include, but are not limited to, a method including adding the self-dispersing pigment, the resin, the surfactant, and optionally other components to the water-soluble solvent to form the water-based ink; a method including adding and dispersing the pigment and the dispersant into the water-soluble solvent and then adding the resin, the surfactant, and optionally other components to the dispersion to form the water-based ink; and a method including adding the pigment, the resin, the surfactant, and optionally other components to the water-soluble solvent and then dispersing the pigment to form the water-based ink.

The surface tension of the water-based ink may be any level as long as the static surface tensions of the respective inks fall within the specified range. The surface tension of the water-based ink preferably has an upper limit of 35.0 mN/m or less, more preferably 32.0 mN/m or less, even more preferably 30.0 mN/m or less. The surface tension of the water-based ink preferably has a lower limit of 21.5 mN/m or more, more preferably 22.5 mN/m or more, even more preferably 23.5 mN/m or more.

The surface tension of the water-based ink can be adjusted to fall within the specified range by controlling the type and content of the water-soluble solvent and the surfactant for the water-based ink.

Overcoat Ink

The overcoat ink is an ink to be ejected onto the water-based ink landed on the substrate. The overcoat ink contains water as a main component. The overcoat ink is a water-based ink for forming an overcoat layer, which contains a specific component to perform a desired function.

For example, an overcoat ink containing a resin (including a resin emulsion) or wax may be used to impart scratch resistance or gloss to printed products. Alternatively, an overcoat ink containing a resin (including a resin emulsion) or a filler may be used to reduce the tackiness of the print surface. Alternatively, a filler-free overcoat ink may be used to change the coating thickness on a pixel-by-pixel basis and thus to provide a rough appearance (matte appearance) to the print surface.

The overcoat ink may further contain a surfactant for controlling its surface tension to a level in an appropriate range. For higher visibility of the water-based ink layer (e.g., decorative layer), the overcoat ink may also be free of any colorant. For that purpose, the colorant content of the overcoat ink is preferably 3.0 mass % or less, more preferably 1.0 mass % or less, even more preferably 0.5 mass % or less, furthermore preferably 0.1 mass % or less, most preferably zero mass % (colorant-free), based on the total mass of the overcoat ink.

The overcoat layer may contain a white pigment to form a white overcoat layer. The overcoat layer may contain a glittering pigment to form a metallic overcoat layer. In those cases, the pigment content of the overcoat ink preferably has a lower limit of 0.05 mass % or more, more preferably 0.08 mass % or more, even more preferably 0.1 mass % or more, based on the total mass of the overcoat ink. The pigment content of the overcoat ink preferably has an upper limit of 20 mass % or less, more preferably 15 mass % or less, even more preferably 10 mass % or less, based on the total mass of the overcoat ink. Examples of the white pigment may include pigments for white color listed above for the water-based ink. Examples of the glittering pigment include pearl pigments with pearlescence or interference gloss, such as mica, titanium dioxide-coated mica, argentine, bismuth oxychloride, silicon dioxide, metal oxides, and laminations thereof; elementary metals, such as aluminum, silver, gold, nickel, chromium, tin, zinc, indium, titanium, and copper; metal compounds; and at least one of alloys or metal mixtures, or other metal-containing glittering pigments.

Resin

The overcoat ink may contain a resin. The overcoat ink containing a resin can form printed products with improved scratch resistance. For high fixing ability and high print water resistance, the resin is preferably in the form of a resin emulsion. In the form of a resin emulsion, the resin can disperse as fine particles in the overcoat ink thanks to steric and electrostatic repulsive forces.

Specifically, the resin may be at least one resin or copolymer resin selected from the group consisting of acrylic resin, styrene-acrylic resin, polyurethane resin, polyester resin, vinyl chloride resin, vinyl acetate resin, polyether resin, vinyl chloride-vinyl acetate copolymer resin, polyethylene resin, acrylamide resin, epoxy resin, polycarbonate resin, silicone resin, and polystyrene resin, or any mixture thereof. These resins are preferred because they can provide higher levels of water resistance and solvent resistance. In particular, the resin preferably includes acrylic resin, which has at least one monomer unit that forms an acrylic skeleton, or acrylic copolymer resin, or the resin preferably includes urethane resin, which has at least one monomer unit that forms a urethane skeleton, or urethane copolymer resin.

Examples of the commercially available resin emulsion include, but are not limited to, ACRIT WEM-031U, WEM-200U, WEM-321, WEM-3000, WEM-202U, and WEM-3008 (acrylic-urethane resin emulsions manufactured by Taisei Fine Chemical Co., Ltd.); ACRIT UW-550CS, UW-223SX, AKW-107, and RKW-500 (acrylic resin emulsions manufactured by Taisei Fine Chemical Co., Ltd.); LUBRIJET N240 (acrylic resin emulsion manufactured by The Lubrizol Corporation); SANCURE 970 (urethane resin emulsion manufactured by the Lubrizol Corporation); SUPERFLEX 150, 210, 470, 500M, 620, 650, E2000, E4800, and R5002 (urethane resin emulsions manufactured by DKS Co., Ltd.); VINYBLAN 701 FE35, 701 FE50, 701 FE65, 700, 701, 711, 737, and 747 (vinyl chloride-acrylic resin emulsions manufactured by Nissin Chemical Industry Co., Ltd.); VINYBLAN 2706 and 2685 (acrylic resin emulsions manufactured by Nissin Chemical Industry Co., Ltd.); MOVINYL 743N, 6520, 6600, 6820, 7470, and 7720 (acrylic resin emulsions manufactured by Japan Coating Resin Co., Ltd.); PRIMAL AC-261P and AC-818 (acrylic resin emulsions manufactured by The Dow Chemical Company); JE-1056 (acrylic resin emulsion manufactured by Seiko PMC Corporation); NeoCryl A2091, A2092, A639, A655, and A662 (styrene-acrylic resin emulsions manufactured by DSM Coating Resins Ltd.); QE-1042 and KE-1062 (styrene-acrylic resin emulsions manufactured by Seiko PMC Corporation); JONCRYL 7199 and PDX-7630A (styrene-acrylic resin emulsions manufactured by BASF Japan); CHALINE R 170BX (silicone-acrylic resin emulsion manufactured by Nissin Chemical Industry Co., Ltd.); TAKELAC W-6010 (urethane resin emulsion manufactured by Mitsui Chemicals, Inc.); Elitel KA-5071S (polyester resin emulsion manufactured by Unitika Ltd.); and Polysol AP-1350 (acrylic resin emulsion manufactured by Showa Denko).

The resin emulsion preferably has an average particle size of 30 nm or more, more preferably 40 nm or more, even more preferably 50 nm or more, for its dispersion stability in the overcoat ink and for ink jettability. The resin emulsion preferably has an average particle size of 300 nm or less, more preferably 270 nm or less, even more preferably 250 nm or less, for its dispersion stability in the ink composition and for ink jettability.

For film water resistance, the resin emulsion preferably has a mass average molecular weight of 10,000 or more, more preferably 50,000 or more, even more preferably 100,000 or more. For ink composition stability, the resin emulsion preferably has a mass average molecular weight of 1,000,000 or less, more preferably 700,000 or less, even more preferably 500,000 or less. In this embodiment, the molecular weight of the resin refers to the mass average molecular weight Mw, which is the value measured by GPC (gel permeation chromatography). The mass average molecular weight Mw may be determined using HLC-8120GPC manufactured by Tosoh Corporation and polystyrene standards for calibration curve.

The content of the resin, if any, in the overcoat ink preferably has a lower limit of 5 mass % or more, more preferably 8 mass % or more, even more preferably 10 mass % or more, based on the total mass of the overcoat ink. The content of the resin in the overcoat ink preferably has an upper limit of 30 mass % or less, more preferably 25 mass % or less, even more preferably 20 mass % or less, based on the total mass of the overcoat ink.

Wax

The overcoat ink may contain wax. The overcoat ink containing wax can form printed products with improved scratch resistance. The wax may be an organic material or silicone compound that is solid at room temperature or lower and will liquefy when heated. Examples of the wax include low-molecular-weight polyolefin waxes, such as polyethylene wax, polypropylene wax, polybutene wax, polyethylene-blend wax, polypropylene wax, and polypropylene-blend wax, silicone (silicon) waxes with softening points, silicone (silicon)-acrylic waxes, fatty acid amides, such as oleic acid amide, erucic acid amide, ricinoleic acid amide, and stearic acid amide, plant waxes, such as ester wax, carnauba wax, rice wax, candelilla wax, wood wax, and jojoba oil, animal waxes, such as beeswax, lanolin, and whale wax, mineral waxes, such as montan wax, ozokerite, ceresin, and Fischer-Tropsch wax, petroleum waxes, such as paraffin wax, microcrystalline wax, petrolatum, and paraffin blend wax, and modifications thereof. These waxes are readily available commercially. In particular, polyethylene wax or silicone surfactant wax is preferably used. Examples of such polyethylene wax and silicone surfactant wax include AQUACER 515 and 531 (polyethylene wax emulsions manufactured by BYK-Chemie), NOPCOAT PEM-17 (polyethylene wax emulsion manufactured by San Nopco Limited), TEGO Glide 410, 440, 450, 482, 485, and 496 (silicone surfactants manufactured by Evonik Industries), and SILFACE SAG005 and SILFACE SAG008 (silicone surfactants manufactured by Nissin Chemical Co., Ltd.). The overcoat ink according to this embodiment may contain one of these waxes or a combination of two or more of these waxes.

The content of the wax, if any, in the overcoat ink preferably has a lower limit of 0.05 mass % or more, more preferably 0.10 mass % or more, even more preferably 0.15 mass % or more, based on the total mass of the overcoat ink. The wax content preferably has an upper limit of 5.0 mass % or less, more preferably 3.0 mass % or less, even more preferably 2.0 mass % or less, based on the total mass of the overcoat ink.

Water

The overcoat ink contains water as a main component. The water is preferably deionized water or any other type of water free of various types of ions. The content of water in the overcoat ink may be any suitable level that allows dispersion or dissolution of each component. The content of water in the overcoat ink preferably has a lower limit of 30 mass % or more, more preferably 50 mass % or more, even more preferably 55 mass % or more, furthermore preferably 60 mass % or more, based on the total mass of the overcoat ink. The content of water in the overcoat ink preferably has an upper limit of 85 mass % or less, more preferably 82 mass % or less, even more preferably 80 mass % or less, based on the total mass of the overcoat ink.

Water-Soluble Solvent

The overcoat ink according to this embodiment may contain a water-soluble solvent. The water-soluble solvent should be a solvent capable of dispersing or dissolving the colorant and any other component.

Examples of the water-soluble solvent include $C_1$ to $C_5$ alkyl alcohols, such as methyl alcohol, ethyl alcohol, n-propyl alcohol, isopropyl alcohol, n-butyl alcohol, sec-butyl alcohol, tert-butyl alcohol, isobutyl alcohol, and n-pentanol; amides, such as formamide, acetamide, propanamide, butanamide, isobutylamide, pentanamide, N-methylformamide, N-methylacetamide, N-methylpropanamide, N-methylbutanamide, N-methylisobutylamide, N-methylpentanamide, N-ethylformamide, N-ethylacetamide, N-ethylpropanamide, N-ethylbutanamide, N-ethylisobutylamide, N-ethylpentanamide, N-propylformamide, N-propylacetamide, N-propylpropanamide, N-propylbutanamide, N-propylisobutylamide, N-propylpentanamide, N-isopropylformamide, N-isopropylacetamide, N-isopropylpropanamide, N-isopropylbutanamide, N-isopropylisobutylamide, N-isopropylpentanamide, N-butylformamide, N-butylacetamide, N-butylpropanamide, N-butylbutanamide, N-butylisobutylamide, N-butylpentanamide, N,N-dimethylformamide, N,N-dimethylacetamide, N,N-dimethylpropanamide, N,N-dimethylbutanamide, N,N-dimethylisobutylamide, N,N-dimethylpentanamide, N,N-diethylformamide, N,N-diethylacetamide, N,N diethylpropanamide, N,N-diethylbutanamide, N,N-diethylisobutylamide, N,N-diethylpentanamide, N,N-dipropylformamide, N,N-dipropylacetamide, N,N-dipropylpropanamide, N,N-dipropylbutanamide, N,N-dipropylisobutylamide, N,N-dipropylpentanamide, N,N-diisopropylformamide, N,N-diisopropylacetamide, N,N-diisopropylpropanamide, N,N-diisopropylbutanamide, N,N-diisopropylisobutylamide, N,N-diisopropylpentanamide, N,N-dibutylformamide, N,N-dibutylacetamide, N,N-dibutylpropanamide, N,N-dibutylbutanamide, N,N-dibutylisobutylamide, N,N-dibutylpentanamide, N-ethyl-N-methylformamide, N-ethyl-N-methylacetamide, N-ethyl-N-methylpropanamide, N-ethyl-N-methylbutanamide, N-ethyl-N-methylisobutylamide, N-ethyl-N-methylpentanamide, N-methyl-N-propylformamide, N-methyl-N-propylacetamide, N-methyl-N-propylpropanamide, N-methyl-N-propylbutanamide, N-methyl-N-propylisobutylamide, N-methyl-N-propylpentanamide, N-ethyl-N-propylformamide, N-ethyl-N-propylacetamide, N-ethyl-N-propylpropanamide, N-ethyl-N-propylbutanamide, N-ethyl-N-propylisobutylamide, and N-ethyl-N-propylpentanamide; ketones or keto alcohols, such as acetone and diacetone alcohol; ethers, such as tetrahydrofuran and dioxane; oxyethylene or oxypropylene copolymers, such as polyethylene glycol and polypropylene glycol; diols, such as ethylene glycol, propylene glycol, diethylene glycol, dipropylene glycol, 1,3-propanediol, isobutylene glycol, triethylene glycol, tripropylene glycol, tetraethylene glycol, 1,3-propanediol, 2-methyl-1,2-propanediol, 2-methyl-1,2-propanediol, 1,2-butanediol, 1,3-butanediol, 1,4-butanediol, 1,2-pentanediol, 1,3-pentanediol, 1,2-hexanediol, 1,5-pentanediol, 1,6-hexanediol, 2-methyl-2,4-pentanediol, 3-methyl-1,3-butanediol, 3-methyl-1,5-pentanediol, and 2-methyl-2,4-pentanediol; triols, such as glycerol, trimethylolethane, trimethylolpropane, and 1,2,6-hexanetriol; tetrahydric alcohols, such as meso-erythritol and pentaerythritol; monoalkyl ethers, such as ethylene glycol monomethyl (or ethyl, isopropyl, n-butyl, isobutyl, n-hexyl, or 2-ethylhexyl) ether, diethylene glycol monomethyl (or ethyl, isopropyl, n-butyl, isobutyl, n-hexyl, or 2-ethylhexyl) ether, triethylene glycol monomethyl (or ethyl, propyl, isopropyl, n-butyl, isobutyl, tert-butyl, pentyl, n-hexyl, or 2-ethylhexyl) ether, propylene glycol monomethyl (or ethyl, propyl, isopropyl, n-butyl, isobutyl, tert-butyl, pentyl, n-hexyl, or 2-ethylhexyl) ether, dipropylene glycol monomethyl (or ethyl, propyl, isopropyl, n-butyl, isobutyl, tert-butyl, pentyl, n-hexyl, or 2-ethylhexyl) ether, and tripropylene glycol monomethyl (or ethyl, propyl, isopropyl, n-butyl, isobutyl, tert-butyl, pentyl, n-hexyl, or 2-ethylhexyl) ether; polyhydric alcohol dialkyl ethers, such as diethylene glycol dimethyl ether, diethylene glycol diethyl ether, diethylene glycol ethyl methyl ether, triethylene glycol dimethyl ether, triethylene glycol diethyl ether, triethylene glycol ethyl methyl ether, tetraethylene glycol dimethyl ether, tetraethylene glycol diethyl ether, tetraethylene glycol ethyl methyl ether, propylene glycol dimethyl ether, propylene glycol diethyl ether, propylene glycol ethyl methyl ether, dipropylene glycol dimethyl ether, dipropylene glycol diethyl ether, dipropylene glycol ethyl methyl ether, tripropylene glycol dimethyl ether, tripropylene glycol diethyl ether, and tripropylene glycol ethyl methyl ether; acetates, such as ethylene glycol monomethyl (or ethyl, propyl, isopropyl, n-butyl, isobutyl, tert-butyl, pentyl, n-hexyl, or 2-ethylhexyl) ether acetate, diethylene glycol monomethyl (or ethyl, propyl, isopropyl, n-butyl, isobutyl, tert-butyl, pentyl, n-hexyl, or 2-ethylhexyl) ether acetate, triethylene glycol monomethyl (or ethyl, propyl, isopropyl, n-butyl, isobutyl, tert-butyl, pentyl, n-hexyl, or 2-ethylhexyl) ether acetate, propylene glycol monomethyl (or ethyl, propyl, isopropyl, n-butyl, isobutyl, tert-butyl, pentyl, n-hexyl, or 2-ethylhexyl) ether acetate, dipropylene glycol monomethyl (or ethyl, propyl, isopropyl, n-butyl, isobutyl, tert-butyl, pentyl, n-hexyl, or 2-ethylhexyl) ether acetate, tripropylene glycol monomethyl (or ethyl, propyl, isopropyl, n-butyl, isobutyl, tert-butyl, pentyl, n-hexyl, or 2-ethylhexyl) ether acetate, ethylene glycol diacetate, diethylene glycol diacetate, propylene glycol diacetate, and dipropylene glycol diacetate; lactones, such as γ-butyrolactone, α-methylene-γ-butyrolactone, ε-caprolactone, γ-valerolactone, γ-hexanolactone, γ-heptanolactone, δ-valerolactone, δ-hexanolactone, δ-heptalactone, δ-octalactone, δ-nonalactone, δ-decalactone, δ-undecalactone, γ,γ-dimethyl-γ-butyrolactone, α-methyl-γ-butyrolactone, γ-crotolactone, α-methylene-γ-butyrolactone, β-methyl-γ-butyrolactone, and 6-methylvalerolactone; carbonate esters, such as 2,3-butylene carbonate, ethylene carbonate, and propylene carbonate; oxazolidinone solvents, such as 3-methyl-2-oxazolidinone, 3-ethyl-2-oxazolidinone, and N-vinylmethyloxazolidinone; $C_1$ to $C_5$ alkyl alcohols, such as methyl alcohol, ethyl alcohol, n-propyl alcohol, isopropyl alcohol, n-butyl alcohol, sec-butyl alcohol, tert-butyl alcohol, isobutyl alcohol, and n-pentanol; monohydric alcohols, such as 3-methoxy-3-methyl-1-butanol, 3-methoxy-1-propanol, 1-methoxy-2-propanol, and 3-methoxy-n-butanol; ketones or keto alcohols, such as acetone and diacetone alcohol; ethers, such as tetrahydrofuran and dioxane; oxyethylene or oxypropylene copolymers, such as polyethylene glycol and polypropylene glycol; diols, such as ethylene glycol, propylene glycol, diethylene glycol, dipropylene glycol, 1,3-propanediol, isobutylene glycol, triethylene glycol, tripropylene glycol, tetraethylene glycol, 1,3-propanediol, 2-methyl-1,2-propanediol, 2-methyl-1,2-propanediol, 1,2-butanediol, 1,3-butanediol, 1,4-butanediol, 1,2-pentanediol, 1,2-hexanediol, 1,5-pentanediol, 1,6-hexanediol, 2-methyl-2,4-pentanediol, 3-methyl-1,3-butanediol, 3-methyl-1,5-pentanediol, and 2-methyl-2,4-pentanediol; triols, such as glycerol, trimethylolethane, trimethylolpropane, and 1,2,6-hexanetriol; tetrahydric alcohols, such as meso-erythritol and pentaerythritol; alkanolamines, such as monoethanolamine, diethanolamine, triethanolamine, N-methylethanolamine, N-ethylethanolamine, N-butylethanolamine, N-methyldiethanolamine, N-ethyldiethanolamine, and N-butyldiethanolamine; nitrogen-containing heterocyclic compounds, such as N-methyl-2-pyrrolidone, 2-pyrrolidone, and 1,3-dimethyl-2-imidazolidinone; cyclic compounds, such as γ-butyrolactone and sulfolane; morpholines, such as N-methylmorpholine, N-ethylmorpholine, and N-formylmorpholine; and terpene solvents. In particular, the water-soluble solvent is preferably selected so as to allow the overcoat ink to have a desired static surface tension, and for example, propylene glycol is preferably used.

The content of the water-soluble solvent in the overcoat ink may be any suitable level that allows dispersion or dissolution of each component. The content of the water-soluble solvent in the overcoat ink preferably has a lower limit of 5 mass % or more, more preferably 10 mass % or more, even more preferably 12 mass % or more, based on the total mass of the overcoat ink.

The content of the water-soluble solvent in the overcoat ink preferably has an upper limit of 50 mass % or less, more preferably 45 mass % or less, even more preferably 40 mass % or less, based on the total mass of the overcoat ink.

Surfactant

The overcoat ink according to this embodiment may contain a surfactant. The addition of the surfactant can control the surface tension of the overcoat ink to a level in an appropriate range. For example, the surfactant is preferably, but not limited to, an anionic surfactant, a nonionic surfactant, a silicone (silicon) surfactant, a fluorinated surfactant, or an acetylene glycol surfactant, which has a high ability to control surface tension. In particular, a silicone (silicon) surfactant is preferred.

Examples of the surfactant include EMAL, LATEMUL, PELEX, NEOPELEX, and DEMOL (all anionic surfactants manufactured by Kao Corporation), SUNNOL, LIPOLAN, LIPON, and LIPAL (all anionic surfactants manufactured by Lion Corporation), NOIGEN, EPAN, and SORGEN (all nonionic surfactants manufactured by DKS Co., Ltd.), EMULGEN, AMIET, and EMASOL (all nonionic surfactants manufactured by Kao Corporation), NAROACTY, EMULMIN, and SANNONIC (all nonionic surfactants manufactured by Sanyo Chemical Industries, Ltd.), SURFYNOL 104, 82, 420, 440, 465, 485, TG, 2502, SE-F, and 107L, and DYNOL 360, 604, and 607 (all acetylene glycol surfactants manufactured by Evonik Industries), DYNOL 960 (a blend of acetylene glycol and silicone surfactants, manufactured by Evonik Industries), SURFYNOL AD01 (alkane glycol surfactant manufactured by Evonik Industries), OLFINE E1004, E1010, PD004, and EXP4300 (all acetylene glycol surfactants manufactured by Nissin Chemical Co., Ltd.), MEGAFACE (fluorinated surfactant manufactured by DIC Corporation), SURFLON (fluorinated surfactant manufactured by AGC Seimi Chemical Co., Ltd.), BYK 302, 306, 307, 331, 333, 345, 346, 347, 348, 349, 3420, 3450, 3451, 3455, and 3456 (all silicone (silicon) surfactants manufactured by BYK-Chemie), KP-110, KP-112, KP-323, KP-341, and KP-6004 (all silicone (silicon) surfactants manufactured by Shin-Etsu Chemical Co., Ltd.), SILFACE SAG002, SILFACE SAG005, SILFACE SAG008, SILFACE SAG014, SILFACE SAG503A, SILFACE SJM002, SILFACE SJM-002, and SILFACE SJM-003 (all silicone (silicon) surfactants manufactured by Nissin Chemical Co., Ltd.), TEGO FLOW 425, TEGO Glide 100, 110, 130, 410, 432, 440, 450, 482, 490, 492, 494, 496, ZG400, TEGO Twin 4000, TEGO Twin 4100, TEGO Twin 4200, and TEGO Wet 240, KL245, 250, 260, 265, 270, and 280 (all silicone (silicon) surfactants manufactured by Evonik Industries), and TEGO Wet 500, 505, 510, and 520 (all nonionic surfactants manufactured by Evonik Industries).

The content of the surfactant in the overcoat ink may be any level as long as the static surface tensions of the respective inks fall within the specified range. The content of the surfactant in the overcoat ink preferably has a lower limit of 0.5 mass % or more, more preferably 0.8 mass % or more, even more preferably 1.0 mass % or more, based on the total mass of the overcoat ink. The content of the surfactant in the overcoat ink preferably has an upper limit of 5.0 mass % or less, more preferably 4.5 mass % or less, even more preferably 4.0 mass % or less, based on the total mass of the overcoat ink.

Other Components

If necessary, the overcoat ink may further contain a conventionally known additive. Examples of such an additive include a viscosity modifier, a pH adjuster, an antioxidant, a preservative, an antifungal agent, and so on.

The overcoat ink may be prepared by any suitable method. For example, such a method includes adding the resin, the surfactant, and optionally other components to the water-soluble solvent to form the overcoat ink.

The surface tension of the overcoat ink may be any level as long as the static surface tensions of the respective inks fall within the specified range. The surface tension of the overcoat ink preferably has an upper limit of 30.0 mN/m or less, more preferably 29.0 mN/m or less, even more preferably 28.0 mN/m or less. The surface tension of the overcoat ink preferably has a lower limit of 19.0 mN/m or more, more preferably 20.0 mN/m or more, even more preferably 21.0 mN/m or more. In this regard, the static surface tension is the value measured at a temperature of 25° C. by the Wilhelmy method (equipment: Model DY-300 manufactured by Kyowa Interface Science Co., Ltd.).

The surface tension of the overcoat ink can be adjusted to fall within the specified range by controlling the type and content of the water-soluble solvent and the surfactant for the overcoat ink.

1-3. Recording Method

An embodiment of the present invention is directed to a recording method using the ink set including the pretreatment ink, the water-based ink, and the overcoat ink, the method including: jetting each of the inks of the ink set onto a substrate using a single-pass system.

FIG. 1 shows a device 1 for ejecting the ink set onto a substrate, which is suitable for use in the recording method according to this embodiment. The device 1 includes a pretreatment ink ejection unit 21 that ejects the pretreatment ink 11; a water-based ink ejection unit 22 that ejects the water-based ink 12; and an overcoat ink ejection unit 23 that ejects the overcoat ink 13, in which the pretreatment ink ejection unit 21, the water-based ink ejection unit 22, and the overcoat ink ejection unit 23 are arranged in this order along a direction in which a substrate (recording medium) is to be fed. The device 1 is characterized in that it has no drying mechanism between the pretreatment ink ejection unit 21 and the water-based ink ejection unit 22 and no drying mechanism between the water-based ink ejection unit 22 and the overcoat ink ejection unit 23.

The static surface tensions of the respective inks of the ink set described above are controlled within specific ranges to satisfy the relation So≤Sp<Sc. This feature makes it possible to effectively prevent the water-based ink from bleeding even in a high-speed, single-pass printing process using the device 1 shown in FIG. 1, which has no drying mechanism between each set of the adjacent ejection units so that no drying process is performed until all the inks of the ink set are ejected onto the substrate.

The recording method according to this embodiment has been described with reference to an inkjet recording method using the ink set including the pretreatment ink, the water-based ink, and the overcoat ink. It should be noted that the water-based ink can also be effectively prevented from bleeding in the recording method using the ink set including the pretreatment ink and the water-based ink.

The printing may also be performed using a device having a drying mechanism between each set of the adjacent ejection units. However, the device with no drying mechanism between each set of the adjacent ejection units can be made compact and have a feed unit with a short entire length to achieve high-speed printing with the water-based ink being effectively prevented from bleeding.

The recording method according to this embodiment is preferably performed at a recording rate (substrate feed rate) of 30 m/min or more, more preferably 40 m/min or more, even more preferably 50 m/min or more. The water-based ink can be effectively prevented from bleeding even when each of the inks of the ink set is jetted onto the substrate (recording medium) being fed at such a high rate.

1-4. Method of Producing Print

An embodiment of the present invention is directed to a method of producing a print using the ink set including the pretreatment ink, the water-based ink, and the overcoat ink, the method including jetting each of the inks of the ink set onto a substrate using a single-pass system.

The static surface tensions of the respective inks of the ink set described above are controlled within specific ranges to satisfy the relation So≤Sp<Sc. This feature makes it possible to effectively prevent the water-based ink from bleeding even in a high-speed, single-pass printing process using the device 1 shown in FIG. 1, which has no drying mechanism between each set of the adjacent ejection units.

1-5. Print

The print produced by the print production method according to the embodiment described above includes layers, each of which will be described below.

Medium (Recording Medium)

Any substrate (recording medium) may be used for the recording method according to this embodiment. Various substrates may be used, including non-absorbent substrates, such as resin substrates, metal sheets, and glass substrates; absorbent substrates, such as paper sheets and fabrics; and surface-coated substrates, such as absorbing layer-bearing substrates. The same applies to the substrate for use in the print production method according to another embodiment described later.

Examples of the non-absorbent substrate include substrates of resins, such as polyester resin, polypropylene synthetic paper, vinyl chloride resin, and polyimide resin; and substrates of metal, metallic foil-coated paper, glass, synthetic rubber, and natural rubber.

Examples of the absorbent substrate include woody paper, medium-quality paper, high-quality paper, cotton, chemical fiber fabrics, silk, linen, woven fabrics, non-woven fabrics, and leather.

Examples of the surface-coated substrate include coated paper, art paper, cast paper, lightweight coated paper, and fine coated paper.

Water-Based Ink Layer

A water-based ink layer is formed when the solvent is evaporated from the water-based ink described above. For example, in a case where the water-based ink contains the colorant, the water-based ink layer will serve as a decorative layer for forming the desired image. The water-based ink is effectively prevented from bleeding by ejecting the different inks of the ink set according to the embodiment described above.

In a case where the water-based ink contains the resin, the resin will serve as a component to form the water-based ink layer.

Overcoat Layer

An overcoat layer is formed when the solvent is evaporated from the overcoat ink described above. The overcoat layer may contain a specific component for providing a desired function. The overcoat layer is disposed on top of the water-based ink layer.

For example, the overcoat ink may contain a resin (including a resin emulsion) or wax for the purpose of imparting scratch resistance or gloss to printed products. Alternatively, the overcoat ink may contain a resin (including a resin emulsion) or a filler for the purpose of reducing the tackiness of the print surface. Alternatively, a filler-free overcoat ink may be used to change the coating thickness on a pixel-by-pixel basis and thus to provide a rough appearance (matte appearance) to the print surface.

The overcoat layer may contain a white pigment and serve as a white layer or may contain a glittering pigment and serve as a metallic layer.

1-6. Device

The present invention is directed to an ink set ejection device for using the ink set including the pretreatment ink and the water-based ink, which have static surface tensions falling within the specified range (Sp<Sc). Specifically, the ink set ejection device includes at least a pretreatment ink ejection unit that ejects the pretreatment ink; and a water-based ink ejection unit that ejects the water-based ink, in which the pretreatment ink ejection unit and the water-based ink ejection unit are arranged in this order along the direction in which the substrate is to be fed.

The static surface tensions of the respective inks of the ink set are controlled to fall within the specified range. This feature makes it possible to effectively prevent the water-based ink from bleeding even in printing by inkjet recording.

A particularly preferred example of the device will be described with reference to FIG. 1. FIG. 1 shows an ink set ejection device for using the ink set including the pretreatment ink, the water-based ink, and the overcoat ink, which have static surface tensions falling within the specified range (So≤Sp<Sc). The device of FIG. 1 is characterized in that it has no drying mechanism between the pretreatment ink ejection unit and the water-based ink ejection unit and no drying mechanism between the water-based ink ejection unit and the overcoat ink ejection unit.

The static surface tensions of the respective inks of the ink set are controlled within specific ranges to satisfy the relation So≤Sp<Sc. This feature makes it possible to effectively prevent the water-based ink from bleeding even in a printing process using the device 1 shown in FIG. 1, which has no drying mechanism between each set of the adjacent ejection units.

Alternatively, the device may have a drying mechanism between the water-based ink ejection unit and the overcoat ink ejection unit and another drying mechanism between the pretreatment ink ejection unit and the water-based ink ejection unit. Alternatively, the device including the pretreatment ink ejection unit, the water-based ink ejection unit, and the overcoat ink ejection unit may have a drying mechanism between the pretreatment ink ejection unit and the water-based ink ejection unit but no drying mechanism between the water-based ink ejection unit and the overcoat ink ejection unit. Alternatively, the device may have a drying mechanism between the water-based ink ejection unit and the overcoat ink ejection unit but no drying mechanism between the pretreatment ink ejection unit and the water-based ink ejection unit. The device of FIG. 1 with no drying mechanism between the water-based ink ejection unit and the overcoat ink ejection unit and no drying mechanism between the pretreatment ink ejection unit and the water-based ink ejection unit can be made compact and have a feed unit with a short entire length to achieve higher speed printing.

Each of the ejection units may use any ejection system, such as piezo, thermal, or electrostatic system.

For all systems, the water-based ink can be effectively prevented from bleeding.

2-1. Outline of Ink Set According to Second Embodiment of the Present Invention

A second embodiment of the present invention is directed to an ink set for use in an inkjet recording method, the ink set including a water-based ink and an overcoat ink each to be jetted onto a substrate, the water-based ink and the overcoat ink having static surface tensions satisfying the relation shown below.

The static surface tension So of the overcoat ink<the static surface tension Sc of the water-based ink Using such an ink set, the water-based ink can be printed while being effectively prevented from bleeding even during high-speed inkjet recording. During high-speed printing by inkjet recording method, the time is relatively short between the landing of the water-based ink on the substrate and the landing of the overcoat ink on the water-based ink on the substrate. This suggests that there is a risk of spreading and bleeding of the water-based ink, which would be caused by the landing of the overcoat ink onto the water-based ink remaining highly fluid on the substrate.

To address this problem, the ink set is designed such that the static surface tension So of the overcoat ink is lower than the static surface tension Sc of the water-based ink. This design can prevent the spreading of the water-based ink even when the overcoat ink is landed on the water-based ink remaining highly fluid on the substrate. This can effectively prevent the bleeding of the water-based ink.

In this regard, the overcoat ink does not always have to be ejected onto the water-based ink remaining highly fluid, and the overcoat ink may be ejected after the water-based ink is dried. Ejecting the overcoat ink onto the water-based ink remaining highly fluid allows high-speed printing.

The ink set according to the second embodiment does not always have to be used for the single-pass inkjet recording method. However, when used for the single-pass inkjet recording method, such as line head printing, the ink set according to the second embodiment will be advantageous in that high-speed printing is possible with it without any problem with the single-pass inkjet recording method.

2-2. Ink Set

Each of the inks of the ink set according to the second embodiment is the same as the corresponding ink of the ink set according to the first embodiment described above.

Regarding the static surface tensions of the inks satisfying the relation So<Sc, the difference (Sc−So) between Sc and So preferably has a lower limit of 0.6 mN/m or more, more preferably 0.8 mN/m or more, even more preferably 0.9 mN/m or more. With a difference (Sc−So) between Sc and So of 0.6 mN/m or more, the water-based ink can be more effectively prevented from bleeding.

The upper limit of the difference (Sc−So) between Sc and So is preferably, but not limited to, 7.5 mN/m or less, more preferably 6.0 mN/m or less, even more preferably 4.5 mN/m or less. With a difference (Sc−So) between Sc and So of 7.5 mN/m or less, the water-based ink can be more effectively prevented from bleeding.

2-3. Recording Method

The static surface tensions of the respective inks of the ink set described above are controlled within specific ranges to satisfy the relation So<Sc. The water-based ink can be effectively prevented from bleeding, for example, even when a single-pass system is used to jet each of the inks of the ink set onto the substrate. In this case, each of the inks of the ink set may be jetted from each of ejection units onto the substrate with no drying mechanism provided between the ejection units. This recording method may be referred to as a method of producing a print using the ink set according to the second embodiment.

The recording method and the print production method are preferably performed at a recording rate (substrate feed rate) of 30 m/min or more, more preferably 40 m/min or more, even more preferably 50 m/min or more.

2-4. Print

The print produced by the print production method according to this embodiment described above has features similar to those of the print produced using the ink set according to the first embodiment.

2-5. Device

An ink set ejection device is provided for using the ink set including the water-based ink and the overcoat ink, which have static surface tensions falling within the specified range (So<Sc). Specifically, the ink set ejection device includes at least a water-based ink ejection unit that ejects the water-based ink; and an overcoat ink ejection unit that ejects the overcoat ink, in which the water-based ink ejection unit and the overcoat ink ejection unit are arranged in this order along the direction in which the substrate is to be fed.

The device preferably has no drying mechanism between the water-based ink ejection unit and the overcoat ink ejection unit, although it may have a drying mechanism between the water-based ink ejection unit and the overcoat ink ejection unit. The water-based ink can be effectively prevented from bleeding even when printing is performed using such a device with no drying mechanism between the ejection units. Moreover, the device with no drying mechanism between the water-based ink ejection unit and the overcoat ink ejection unit can be made compact and have a feed unit with a short entire length to achieve higher speed printing.

EXAMPLES

Hereinafter, the present invention will be described in more detail with reference to examples, which are not intended at all to limit the present invention.

Preparation of Inks

Each set of materials were mixed in the ratio (in units of mass %) shown in Table 1 and stirred at room temperature (20 to 25° C.) for 1 hour. It was then confirmed that no material remained undissolved. Each of the resulting mixtures was then filtered through a membrane filter to give each of pretreatment inks, water-based inks, and overcoat inks, the static surface tensions of which were then measured.

The static surface tension was measured at a temperature of 25° C. by the Wilhelmy method (equipment: Model DY-300 manufactured by Kyowa Interface Science Co., Ltd.).

TABLE 1

| | | Pre-treatment ink 1 | Pre-treatment ink 2 | Pre-treatment ink 3 | Pre-treatment ink 4 | Pre-treatment ink 5 |
|---|---|---|---|---|---|---|
| Cationic resin | Unisense KHE 100L | 1.50 | 1.50 | 1.50 | — | 1.50 |
| Multivalent metal salt | Calcium acetate | — | — | — | 10.00 | — |
| Resin emulsion | HYDRAN CP-7050 | 3.00 | 3.00 | 3.00 | — | 3.00 |
| Surfactant | BYK347 | 2.00 | 2.00 | — | — | — |
| | BYK348 | — | — | — | 0.50 | — |
| | Dynol604 | — | — | 0.75 | — | 0.75 |
| Solvent | 1,2-Pentanediol | 15.00 | — | — | — | — |
| | 1,2-Butanediol | — | 30.00 | 30.00 | — | — |
| | Propylene glycol | — | — | — | 25.00 | — |
| | Glycerol | — | — | — | — | 15.00 |
| | Ion-exchanged water | 78.50 | 63.50 | 64.75 | 64.50 | 79.75 |
| Static surface tension [mN/m] (25° C.) | | 22.5 | 24.5 | 28.0 | 22.5 | 28.0 |

In Table 1, "Unisense KHE 100L" is a water-soluble quaternary ammonium salt type resin manufactured by Senka Corporation.
In Table 1, "HYDRAN CP-7050" is a cationic urethane resin emulsion manufactured by DIC Corporation.
In Table 1, "BYK 347" and "BYK 348" are silicone surfactants manufactured by BYK-Chemie.
In Table 1, "Dynol 604" is 2,5,8,11-tetramethyl-6-dodecyn-5,8-diol, ethoxylated, manufactured by Evonik Industries.

TABLE 2

|  |  | Water-based ink 1 | Water-based ink 2 | Water-based ink 3 | Water-based ink 4 | Water-based ink 5 | Water-based ink 6 |
|---|---|---|---|---|---|---|---|
| Pigment | Black pigment | 3.00 | 3.00 | 3.00 | 3.00 | — | 3.00 |
| Self-dispersing pigment | CAB-O-JET400 | — | — | — | — | 5.00 | — |
| Dispersant | DISPERBYK-190 | 0.50 | 0.50 | 0.50 | 0.50 | — | 0.50 |
| Resin emulsion | PRIMALAC-261P | 6.00 | 6.00 | 6.00 | 6.00 | 5.00 | 6.00 |
| Surfactant | BYK349 | 2.00 | 0.50 | 0.50 | — | — | 2.50 |
|  | BYK348 | — | — | — | — | 0.30 | — |
|  | Dynol604 | — | — | — | 0.90 | — | — |
| Solvent | 1,3-Pentanediol | 35.00 | — | 5.00 | 35.00 | 5.00 | 30.00 |
|  | Propylene glycol | — | 35.00 | 30.00 | — | 30.00 | — |
|  | Ion-exchanged water | 53.50 | 55.00 | 55.00 | 54.60 | 54.70 | 58.00 |
| Static surface tension [mN/m] (25° C.) |  | 23.5 | 26.0 | 27.0 | 30.0 | 26.0 | 23.0 |

In Table 2, "Black pigment" is carbon black (C.I. Pigment Black 7).
In Table 2, "CAB-O-JET-400" is a carbon black (C.I. Pigment Black 7) dispersion manufactured by Cabot Corporation.
In Table 2, "DISPERBYK-190" is a styrene-based dispersant manufactured by BYK-Chemie.
In Table 2, "PRIMALAC-261P" is an anionic acrylic resin emulsion manufactured by The Dow Chemical Company.
In Table 2, "BYK 349" and "BYK 348" are silicone surfactants manufactured by BYK-Chemie.
In Table 2, "Dynol 604" is 2,5,8,11-tetramethyl-6-dodecyn-5,8-diol, ethoxylated, manufactured by Evonik Industries.

A cyan water-based ink, a yellow water-based ink, and a magenta water-based ink were also prepared in the same manner as in the preparation of the black water-based ink shown above, except that C.I. Pigment Blue 15:4 (PB 15:4), C.I. Pigment Red 122 (PR 122), and C.I. Pigment Yellow 74 (PY 74) were each used instead of the carbon black. Each of the water-based inks with the different colorants had the same level of static surface tension as that of the black water-based ink shown above. A cyan water-based ink, a yellow water-based ink, and a magenta water-based ink were also each prepared in the same way as in the preparation of water-based ink 4 except that a cyan, yellow, or magenta, self-dispersing pigment was used instead.

TABLE 3

|  |  | Overcoat ink 1 | Overcoat ink 2 | Overcoat ink 3 | Overcoat ink 4 | Overcoat ink 5 | Overcoat ink 6 |
|---|---|---|---|---|---|---|---|
| Resin emulsion | SANCURE970 | 15.00 | 15.00 | 15.00 | 15.00 | 15.00 | 15.00 |
| Wax | AQUACER531 | 0.50 | 0.50 | 0.50 | 0.50 | 0.50 | 0.50 |
| Surfactant | BYK345 | 3.00 | 3.50 | 2.00 | 3.50 | — | — |
|  | SILFACE SAG002 | — | — | — | — | — | 1.00 |
|  | BYK349 | — | — | — | — | 2.00 | — |
| Solvent | Propylene glycol | 30.00 | 30.00 | 30.00 | 20.00 | 30.00 | 30.00 |
|  | Ion-exchanged water | 51.50 | 51.00 | 52.50 | 61.00 | 52.50 | 53.50 |
| Static surface tension [mN/m] (25° C.) |  | 22.5 | 22.0 | 24.0 | 21.5 | 23.5 | 30.0 |

In Table 3, "SANCURE 970" is a urethane resin emulsion manufactured by The Lubrizol Corporation.

In Table 3, "AQUACER 531" is a polyethylene wax emulsion manufactured by BYK-Chemie.

In Table 3, "BYK 345" is a silicone surfactant manufactured by BYK-Chemie.

In Table 3, "SILFACE SAG002" is a silicone surfactant manufactured by Nissin Chemical Co., Ltd.

In Table 3, "BYK 349" is a silicone surfactant manufactured by BYK-Chemie.

Evaluation

Ink sets each including the pretreatment ink, the water-based ink, and the overcoat ink were used and evaluated for bleeding. Specifically, using an inkjet printing device with a line head system (single-pass system) and the structure shown in FIG. 1, the pretreatment ink, the water-based ink, and the overcoat ink were ejected in sequence onto the surface of a substrate (recording medium) OK Bouru (coated cardboard manufactured by Ojimateria Co., Ltd.) being fed at a rate of 50 m/min, so that a print with a specific print pattern was produced.

Evaluation of Bleeding

Whether and how the print was blurred was visually evaluated based on the evaluation criteria below.

Evaluation Criteria
A: No blurring was observed, and the image was clear.
B: Very slight blurring was observed, but the image was clear.
C: A little blurring was observed, but the image was practically acceptable.
D: Blurring was observed, and no clear image was obtained.
E: Significant blurring was observed.

When rated A, B, or C, the result of the bleeding evaluation is practically acceptable.

Evaluation of Cissing

The print was visually evaluated for cissing based on the evaluation criteria below.

Evaluation Criteria
A: No cissing was observed, and the print surface was determined to be sufficiently filled with the inks.
B: Slight cissing was observed, but the print surface was determined to be filled with the inks.
C: Cissing was observed, and the print surface was determined to be insufficiently filled with the inks.

When rated A or B, the result of the cissing evaluation is practically acceptable.

Evaluation of Ability to Infiltrate

The pretreatment ink was applied in an amount of 5 g/m2 to a substrate with a bar coater. Subsequently, the time was measured until the ink moved from the substrate surface so that the substrate surface became exposed completely.

Evaluation Criteria
A: The time was less than 10 seconds.
B: The time was 10 seconds or more and less than 15 seconds.
C: The time was 15 seconds or more and less than 20 seconds.
D: The time was 20 seconds or more.

When rated A, B, or C, the result of the evaluation of the ability to infiltrate is practically acceptable.

Evaluation of Scratch Resistance

The print was evaluated for scratch resistance. Specifically, the print sample was evaluated based on the evaluation criteria below after the print surface was rubbed with Shirting No. 3 (cotton) being reciprocated 100 times under a load of 500 g in Color Fastness Rubbing Tester (AB-301 manufactured by Tester Sangyo Co., Ltd.).

Evaluation Criteria
A: The ink film (water-based ink layer) was not rubbed off at all.
B: The area of the ink film (water-based layer) rubbed off was less than 20% of the total test area.
C: The area of the ink film (water-based layer) rubbed off was at least 20% of the total test area.

When rated A or B, the result of the scratch resistance evaluation is practically acceptable.

TABLE 4

| | Pretreatment ink | | Water-based ink | | | | | Water-based overcoat ink | | | | | Evaluation | | | |
|---|---|---|---|---|---|---|---|---|---|---|---|---|---|---|---|---|
| | | | Type | | | | | | | | | | | | | |
| | Type | $S_P$ | BK | C | M | Y | $S_C$ | Type | $S_O$ | $s_c - s_p$ | $s_p - s_o$ | $s_c - s_o$ | Bleeding | Cissing | Infiltration | Scratch resistance |
| Example 1 | 1 | 22.5 | 1 | 1 | 1 | 1 | 23.5 | 1 | 22.5 | 1.0 | 0.0 | 1.0 | B | A | A | A |
| Example 2 | 1 | 22.5 | 1 | 1 | 1 | 1 | 23.5 | 2 | 22 | 1.0 | 0.5 | 1.5 | A | A | A | A |
| Example 3 | 1 | 22.5 | 2 | 2 | 2 | 2 | 26 | 2 | 22 | 3.5 | 0.5 | 4.0 | A | B | A | A |
| Example 4 | 2 | 24.5 | 3 | 3 | 3 | 3 | 27 | 2 | 22 | 2.5 | 2.5 | 5.0 | B | A | A | A |
| Example 5 | 2 | 24.5 | 4 | 4 | 4 | 4 | 30 | 3 | 24 | 5.5 | 0.5 | 6.0 | B | B | A | A |
| Example 6 | 3 | 28 | 4 | 4 | 4 | 4 | 30 | 3 | 24 | 2.0 | 4.0 | 6.0 | B | A | B | A |
| Example 7 | 1 | 22.5 | 2 | 2 | 2 | 2 | 26 | 1 | 22.5 | 3.5 | 0.0 | 3.5 | B | B | A | A |
| Example 8 | 2 | 24.5 | 4 | 4 | 4 | 4 | 30 | 4 | 21.5 | 5.5 | 3.0 | 8.5 | B | B | A | A |
| Example 9 | 1 | 22.5 | 1 | 1 | 1 | 1 | 23.5 | — | — | 1.0 | — | — | A | A | A | B |
| Example 10 | 4 | 22.5 | 1 | 1 | 1 | 1 | 23.5 | — | — | 1.0 | — | — | B | A | C | B |
| Example 11 | 1 | 22.5 | 5 | 5 | 5 | 5 | 26 | — | — | 3.5 | — | — | B | B | A | B |
| Example 12 | 4 | 22.5 | 5 | 5 | 5 | 5 | 26 | — | — | 3.5 | — | — | B | B | C | B |
| Example 13 | 1 | 22.5 | 6 | 6 | 6 | 6 | 23 | 1 | 22.5 | 0.5 | 0.0 | 0.5 | C | A | A | A |
| Example 14 | 1 | 22.5 | 1 | 1 | 1 | 1 | 23.5 | 5 | 23.5 | 1.0 | −1.0 | 0.0 | C | B | A | A |
| Example 15 | — | — | 1 | 1 | 1 | 1 | 23.5 | 2 | 22 | — | — | 1.5 | C | B | — | A |
| Comparative Example1 | 2 | 24.5 | 1 | 1 | 1 | 1 | 23.5 | 3 | 24 | −1.0 | 0.5 | −0.5 | D | C | A | A |
| Comparative Example2 | 2 | 24.5 | 1 | 1 | 1 | 1 | 23.5 | 6 | 30 | −1.0 | −5.5 | −6.5 | E | B | A | A |
| Comparative Example3 | 5 | 28 | 1 | 1 | 1 | 1 | 23.5 | 6 | 30 | −4.5 | −2.0 | −6.5 | E | A | D | A |
| Comparative Example4 | — | — | 1 | 1 | 1 | 1 | 23.5 | 3 | 24 | — | — | −0.5 | E | B | — | A |

Table 4 shows that using the ink set according to the present invention, the water-based ink can be effectively prevented from bleeding even during high-speed printing by inkjet recording method.

In particular, Examples 1 to 8, in which So≤Sp was satisfied and Sc−So was at least 0.6 mN/m, showed effective prevention of water-based ink bleeding as compared with Example 14, in which So≤Sp was not satisfied, or Example 13 or 14, in which Sc−So was less than 0.6 mN/m.

Using each of the ink sets of Examples 9 to 12, which includes no overcoat ink, the water-based ink was also effectively prevented from bleeding. In particular, Examples 9 and 11, in which the cationic compound in the pretreatment ink was a cationic resin, showed that the pretreatment ink had a higher ability to infiltrate. Moreover, Examples 9 and 10, in which the pigment in the water-based ink was free of any self-dispersing pigment, showed effective prevention of the water-based ink from causing cissing. The ink sets of Examples 9 to 12 included no overcoat ink, and the prints produced with the ink sets of Examples 9 to 12 had no overcoat layer. Thus, they were evaluated as having lower scratch resistance than that of the prints produced with the ink sets of other examples including the overcoat ink.

A comparison of the ink sets of Example 15, in which So<Sc, and Comparative Example 4, both including the water-based ink and the overcoat ink, showed that the ink set of Example 15 was effective in preventing the bleeding of the water-based ink as compared with that of Comparative Example 4.

EXPLANATION OF REFERENCE NUMERALS

1: Device
11: Pretreatment ink
12: Water-based ink
13: Overcoat ink
21: Pretreatment ink ejection unit
22: Water-based ink ejection unit
23: Overcoat ink ejection unit
31: Drying mechanism
1A: Device
11A: Pretreatment ink
12A: Water-based ink
13A: Overcoat ink
21A: Pretreatment ink ejection unit
22A: Water-based ink ejection unit
23A: Overcoat ink ejection unit
31A: Drying mechanism
32A: Drying mechanism
33A: Drying mechanism

The invention claimed is:

1. An ink set for use in an inkjet recording method, the ink set comprising a pretreatment ink and a water-based ink each to be jetted onto a substrate, wherein
the pretreatment ink contains a cationic compound and a resin different from the cationic compound, at least a portion of the resin being contained in the form of a resin emulsion,
the pretreatment ink and the water-based ink have static surface tensions satisfying the following relation:

the static surface tension Sp of the pretreatment ink<the static surface tension Sc of the water-based ink.

2. The ink set according to claim 1, further comprising an overcoat ink, wherein the overcoat ink, the pretreatment ink, and the water-based ink have static surface tensions satisfying the following relation:

the static surface tension So of the overcoat ink≤the static surface tension Sp of the pretreatment ink<the static surface tension Sc of the water-based ink.

3. The ink set according to claim 2, wherein the static surface tension Sc of the water-based ink and the static surface tension So of the overcoat ink have a difference of 0.6 mN/m or more.

4. The ink set according to claim 2, wherein the ink set is for use in a single-pass inkjet recording method including jetting each of inks onto a substrate using a single-pass system.

5. An inkjet recording method using the ink set according to claim 2,
the inkjet recording method comprising jetting each of the inks of the ink set onto a substrate using a single-pass system.

6. A method of producing a print using the ink set according to claim 2,
the method comprising jetting each of the inks of the ink set onto a substrate using a single-pass system.

7. The ink set according to claim 1, wherein the ink set is for use in a single-pass inkjet recording method including jetting each of inks onto a substrate using a single-pass system.

8. An inkjet recording method using the ink set according to claim 1,
the inkjet recording method comprising jetting each of the inks of the ink set onto a substrate using a single-pass system.

9. The inkjet recording method according to claim 8, wherein each of the inks of the ink set is jetted onto the substrate from each of ejection units with no drying mechanism between the ejection units.

10. A method of producing a print using the ink set according to claim 1,
the method comprising jetting each of the inks of the ink set onto a substrate using a single-pass system.

11. The method according to claim 10, wherein each of the inks of the ink set is jetted onto the substrate from each of ejection units with no drying mechanism between the ejection units.

12. A device for ejecting, onto a substrate, an ink set comprising a pretreatment ink and a water-based ink, the device comprising:
a pretreatment ink ejection unit that ejects the pretreatment ink; and
a water-based ink ejection unit that ejects the water-based ink,
the pretreatment ink ejection unit and the water-based ink ejection unit being arranged in this order along a direction in which the substrate is to be fed,
the pretreatment ink and the water-based ink having static surface tensions satisfying the following relation:

the static surface tension Sp of the pretreatment ink<the static surface tension Sc of the water-based ink, and the pretreatment ink containing a cationic compound and a resin different from the cationic compound, at least a portion of the resin being contained in the form of a resin emulsion.

13. The device according to claim 12, wherein no drying mechanism is provided between the pretreatment ink ejection unit and the water-based ink ejection unit.

14. A device for ejecting an ink set comprising a pretreatment ink, a water-based ink, and an overcoat ink, the device comprising:

a pretreatment ink ejection unit that ejects the pretreatment ink;

a water-based ink ejection unit that ejects the water-based ink; and an overcoat ink ejection unit that ejects the overcoat ink onto a substrate, the pretreatment ink ejection unit, the water-based ink ejection unit, and the overcoat ink ejection unit being arranged in this order along a direction in which the substrate is to be fed, the pretreatment ink, the water-based ink, and the overcoat ink having static surface tensions satisfying the following relation:

the static surface tension $S_o$ of the overcoat ink≤the static surface tension $S_p$ of the pretreatment ink<the static surface tension $S_c$ of the water-based ink, and the pretreatment ink containing a cationic compound and a resin different from the cationic compound, at least a portion of the resin being contained in the form of a resin emulsion.

15. The device according to claim 14, wherein no drying mechanism is provided between the water-based ink ejection unit and the overcoat ink ejection unit.

16. The device according to claim 14, wherein no drying mechanism is provided between the pretreatment ink ejection unit and the water-based ink ejection unit.

17. The device according to claim 14, wherein no drying mechanism is provided between the water-based ink ejection unit and the overcoat ink ejection unit and no drying mechanism is provided between the pretreatment ink ejection unit and the water-based ink ejection unit.

* * * * *